(12) United States Patent
Cohn

(10) Patent No.: US 6,897,966 B2
(45) Date of Patent: May 24, 2005

(54) NON-CONTACTING MENSURATION SYSTEM

(75) Inventor: Ralph F. Cohn, Brookline, MA (US)

(73) Assignee: Poster-Miller, Inc., Waltham, MA (US)

( * ) Notice: Subject to any disclaimer, the term of this patent is extended or adjusted under 35 U.S.C. 154(b) by 488 days.

(21) Appl. No.: 10/116,994

(22) Filed: Apr. 5, 2002

(65) Prior Publication Data

US 2003/0002051 A1 Jan. 2, 2003

Related U.S. Application Data

(60) Provisional application No. 60/293,676, filed on May 25, 2001.

(51) Int. Cl.$^7$ .......................... G01B 11/24; G06K 9/00; H04N 15/00
(52) U.S. Cl. ...................... 356/601; 356/603; 356/611; 382/127; 348/42; 348/49
(58) Field of Search ................................. 356/601, 603, 356/604, 606, 607, 611; 382/118, 127, 154; 348/42, 46, 49, 135

(56) References Cited

U.S. PATENT DOCUMENTS

| | | | | |
|---|---|---|---|---|
| 4,737,032 A | * | 4/1988 | Addleman et al. | 356/606 |
| 2001/0001578 A1 | * | 5/2001 | Blais | 356/601 |

* cited by examiner

*Primary Examiner*—Gregory J. Toatley, Jr.
*Assistant Examiner*—Roy M. Punnoose
(74) *Attorney, Agent, or Firm*—Iandiorio & Teska

(57) ABSTRACT

A non-contacting mensuration system including a light source for projecting light on a target; an imager having an image plane; a first optical subsystem configured to project a first image of the light on the target onto a first portion of the image plane of the imager; and a second optical subsystem configured to project a second image of the light on the target onto a second portion of the image plane of the imager so that two different images are obtained from different aspects simultaneously.

15 Claims, 19 Drawing Sheets

NON-CONTACTING MENSURATION SYSTEM

PRIORITY CLAIM

This invention claims priority of Provisional Patent Application Ser. No. 60/293,676 filed May 25, 2001.

FIELD OF THE INVENTION

This invention relates to a non-contacting measurement system useful for imaging targets of various types and for measuring the contours and features thereof. In one example, the contours and features of a plaster model of a human face is scanned and the resulting data used to fabricate a custom-made oxygen mask.

BACKGROUND OF THE INVENTION

Imaging and measuring the contours and features of various targets without touching them, with a probe for example, is known in the art in a variety of fields.

One basic means by which a non-contact optical system can be used to acquire three-dimensional surface information is triangulation. In plane geometry, triangulation determines the distance by observing a point on an object from two different positions separated by a known base line distance. By determining the angles from the two observations sites to a single point on the surface, the length of one side of the triangle and all of the angles are known. This information is sufficient to determine the remaining length of the sides of the triangles and the heights above the base line using trigonometry. A laser can be used to project a beam at a target from a known position and angle. The location of the projected spot is imaged using a CCD camera also fixed at a known location. From the location of the spot on the image captured by the camera, the required azimuth and elevation angles can be determined providing the necessary information relative to the location in three dimensions of that point on the target surface. Since only a single data point is collected for each CCD image processed, however, the surface must be scanned in two dimensions which results in a lengthy data collection/processing duration.

Structured light systems provide a more efficient means of collecting scanned data of the surface of an object. In such a system, a line of light or "light stripe" is projected on the surface. The line is oriented so that stripe is at a constant known azimuth angle, the critical angle that must be known for triangulation. The light fans out over a wide image of elevation angles making this unknown. The light stripe is then imaged by the CCD camera, which captures a two-dimensional image of the projected stripe on the surface. The deviation of the image stripe from a known base line provides a measurement of the azimuth angle at the camera's observation point. The elevation angle may be determined from the distance in the orthogonal direction. Because there is only one elevation angle in this geometry, the system is completely determined and the structured light provides a complete scan along one direction. The mechanical surface scanning process is thus decreased from two dimensions to one dimension and the number of CCD images which must be processed is reduced from $n^2$ to n for a square scan. Scanning is typically accomplished by rotating the specimen while holding the optical system in a fixed position.

In U.S. Pat. No. 4,737,032, incorporated herein by this reference, the contour line formed when the light stripe intersects the target is viewed from two sides but then both of these images are combined by a beam splitter so that the camera only sees one image. Optical alignment of the various optical components, however, is critical in this design and thus the resulting system is not very robust and is difficult to use in factory settings and/or by non-skilled technicians and operators. Any physical disturbance, such as shock, vibration, or thermal cycling, can cause one or more optical components to shift misaligning the system. This misalignment will produce erroneous reading by the system and which can only be corrected by a trained technician with specific skills with optics and optical systems. The lack of robustness in the design of the '032 patent limits its applicability.

SUMMARY OF THE INVENTION

It is therefore an object of this invention to provide a more robust non-contacting mensuration system.

It is a further object of this invention to provide such a non-contacting mensuration system which is easier to use and can be operated by non-skilled technicians and operators.

It is a further object of this invention to provide such a non-contacting mensuration system in which optical alignment of the optical components need not be as precise as the requirements associated with the prior art.

It is a further object of this invention to provide such a non-contacting mensuration system which requires only one imaging camera.

It is a further object of this invention to provide such a system which can be calibrated by non-skilled technicians and operators.

This invention results from the realization that instead of viewing the contour line from two sides and then combining both images into a single image which necessarily results in precise optical alignment requirements, a more robust system can be devised if two different images of the contour line are separately directed onto different portions of the image plane of a single imager.

This invention features a non-contacting mensuration system. A light source projects light on a target and there is an imager having an image plane. A first optical subsystem is configured to project a first image of the light on the target onto a first portion of the image plane of the imager and a second optical subsystem is configured to project a second image of the light on the target onto a second portion of the image plane of the imager so that two different images are obtained from different aspects simultaneously.

Typically, the light source is a laser configured to project a two-dimensional light pattern such as a stripe on the target. In one example, the imager is a single CCD camera. In the preferred embodiment, the first optical subsystem includes a first mirror on one side of the light source oriented to view the first image from a first aspect and a second mirror behind the light source oriented to direct the first image onto the first portion of the image plane. The second optical subsystem then includes a third mirror on another side of the light source oriented to view the second image from a second aspect and a fourth mirror behind the light source oriented to direct the second image onto the second portion of the image plane. In one example, the second mirror and the fourth mirror are opposing faces of a prism.

In the prototype, the first and second mirrors were oriented to provide a 30° observation angle, the light source was positioned directly in front of the image plane of the imager, and the prism was positioned between the light source and the image plane of the imager. Further included may be means for moving the target relative the light source such as a turntable upon which the target is placed. In one embodiment, the non-contacting mensuration system comprises a light source for projecting light onto a target; an imager having an image plane; one mirror located on one side of the light source and oriented to view the target from a first aspect; another mirror located on another side of the light source and oriented to view the target from a second aspect; and a prism positioned between the light source the image plane of the imager having opposing mirror faces oriented to direct images from the two mirrors onto first and second portions on the image plane of the imager simultaneously.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
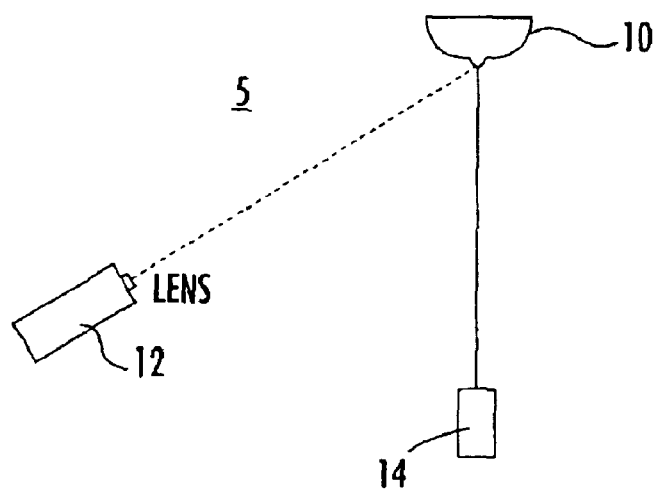
FIG. 1 is a schematic view showing the primary components associated with a prior art imaging system wherein a spot projected by a laser is imaged using a CCD camera.
Figure 2:
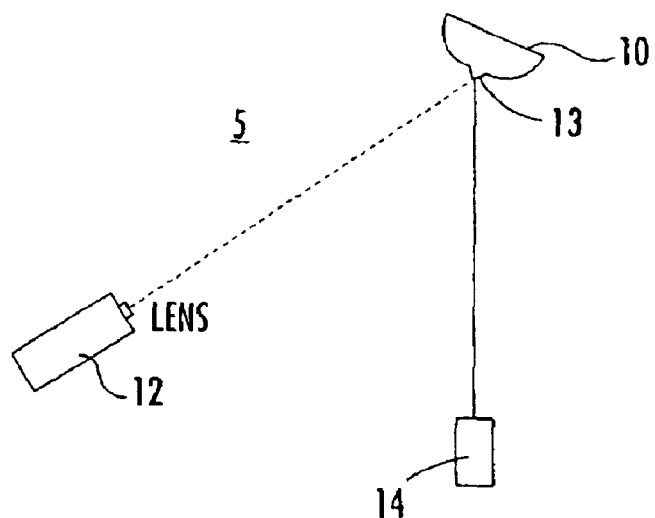
FIG. 2 is a schematic view showing the primary components associated with a prior art imaging system wherein a light stripe projected by a laser is imaged by a CCD camera.

As discussed in the background section above, prior art mensuration system 5. FIG. 1. includes laser 14 which projects a vertical light stripe on target 10 imaged by camera 12. In this example, target 10 is a plaster cast of a human face. As shown in FIG. 2, however, when surface feature 13 (the nose of the face) obscures the vertical stripe projected by laser 14 on target 10, however another camera such as camera 16, FIG. 3, must be used so that at least one view will be unobscured.

Figure 3:
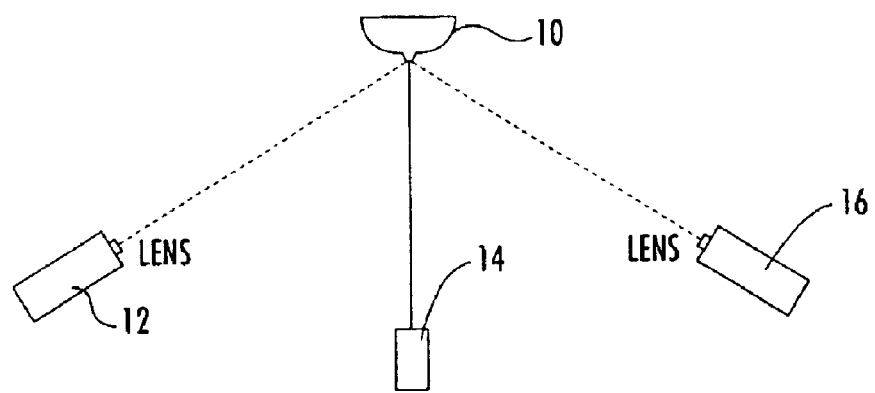
FIG. 3 is a schematic view showing the primary components associated with another prior art imaging system wherein the system of FIG. 2 is modified to include a second CCD camera to overcome the shadowing problem associated with the system shown in FIG. 2.

The problem with the two camera system shown in FIG. 3, however, is that the system cost is higher, and additional processing electronics and data handling/storage capacity must be provided. The system shown in FIG. 3 also doubles the volume of digitized images of the objects and doubles the processing requirements.

Figure 4:
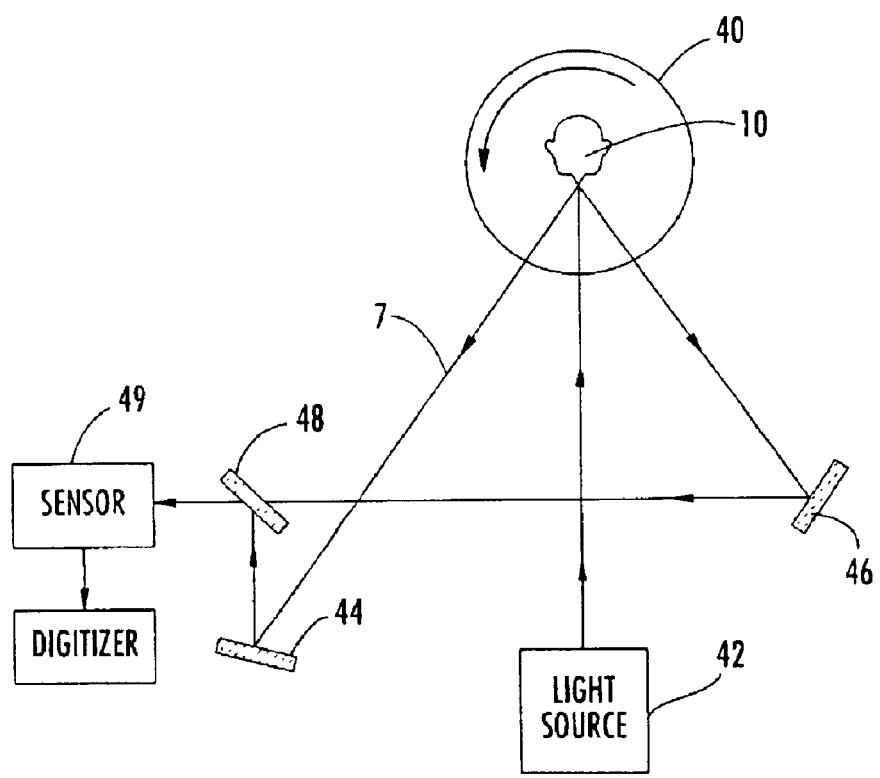
FIG. 4 is a schematic view showing the primary components associated with the imaging system disclosed in U.S. Pat. No. 4,737,032.

In FIG. 4, target 10 rests on turntable 40. Light source 42 provides a plane of light intersecting target 10 providing a contour line. Mirrors 44 and 46 view the contour line from different aspect angles and beamsplitter 48 combines both images so that only one resultant image is directed to sensor (camera) 49. See U.S. Pat. No. 4,737,032. The shortcomings associated with this system are adequately explained in the background section above.

Figure 5:
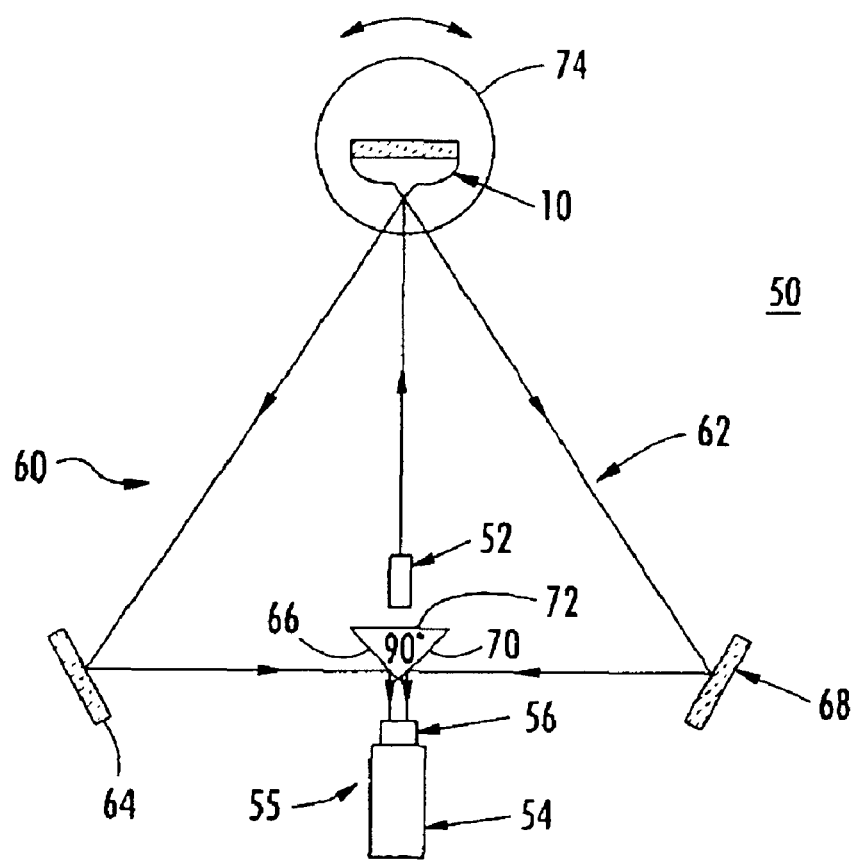
FIG. 5 is a schematic view showing the primary optical components associated with the non-contacting mensuration system of the subject invention.

In the subject invention, in contrast, non-contacting mensuration system 50, FIG. 5 includes source 52 for projecting light on target 10. Typically, light source 52 is a laser such a class II diode laser 1.6 mW, 670 nm configured to project a line beam on target 10 with a 30° fan angle. System 50 also includes imager 55 having an image plane such as a monochrome CCD camera 54 (available from Cohu, Inc. as part no. 212-1000/0000) with lens 56. In accordance with this invention, first optical subsystem 60 is configured to project a first image of the light on target 10 onto a first portion of the image plane of camera 54. And, second optical subsystem 62 is configured to project a second image of the light on target 10 onto a second portion of the image plane of camera 54. In this way, two different images are obtained from different aspects but only one camera is typically used and yet, at the same time, system 50 is more robust and less sensitive to optical misalignments. In the preferred embodiment, first optical subsystem 60 includes first mirror 64 on one side of light source 52 oriented to view the first image from a first aspect and second mirror 66 behind the light source 52 oriented to direct the first image onto the first portion of the image plane of camera 54. The second optical subsystem 62 then includes third mirror 68 on the other side of light source 52 oriented to view the second image from a second aspect and fourth mirror 70 behind light source 52 oriented to direct the second image onto the second portion of the image plane of CCD camera 54.

In the preferred embodiment, mirror 66 and mirror 70 are opposing faces of 90° angle prism 72. Typically, mirror 64 is oriented to provide a 30° observation angle and mirror 68 is also oriented to provide a 30° observation angle. As shown, it is preferred that light source 52 is positioned directly in front of the image plane of camera 54 and prism 72 is positioned between the light source and the image plane of the imager. Further included may be means for moving the target relative to the light source such as turntable 74 upon which the target is placed.

Figure 6:
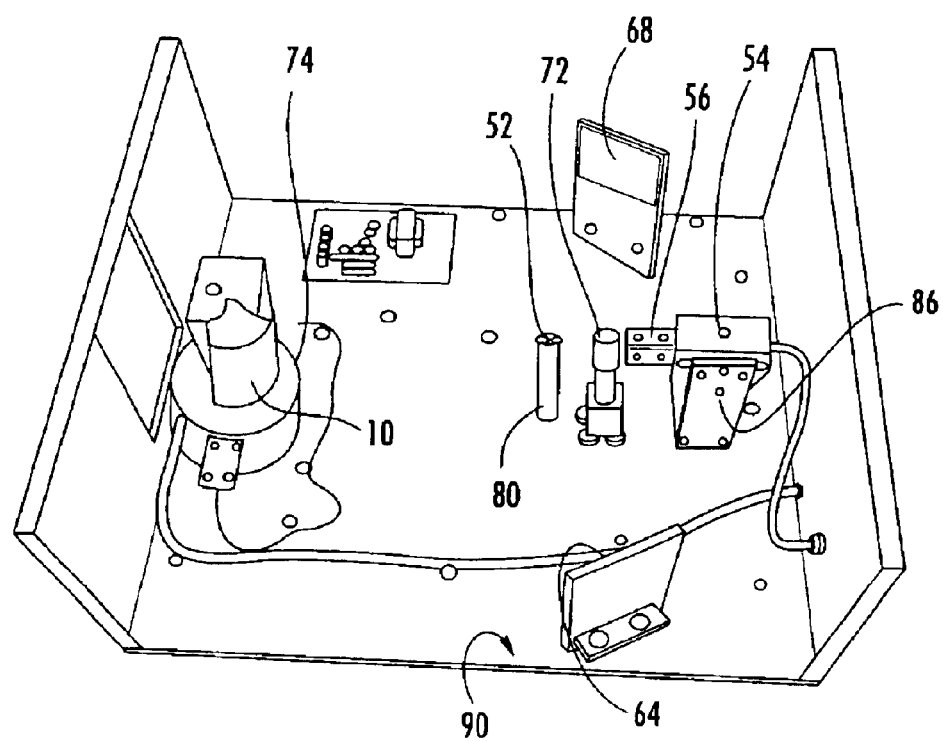
FIG. 6 is a schematic view showing the primary optical components associated with the working embodiment of the mensuration system shown in FIG. 5.

A complete system is shown in FIG. 6. Target 10 in this example is again a cast of a human face mounted on turntable 74 powered by a stepper motor with an angle of 1.8° per step and half step resolution through 100:1 ratio worm gear/worm wheel. In other embodiments, a translation stage may be used or the whole system can be moved with respect to a stationary object. Laser 52 is mounted on an aluminum laser holder 80 which also acts as a heat sink. The laser holder is fixed on a post that is held by a post holder mounted on base 90. Camera 54 is fixed to support 86 mounted on base 90. Lens 56 is a 25 mm, F1.4 lense with manual focus and iris. Mirrors 64 and 68 are held on mirror holders by nylon bushings and screws. The mirror holders are attached to vertical supports with a spring-loaded shoulder bolt which allows precise adjustment of the angular position of the mirrors by turning three adjusting screws. The vertical support is mounted on base 90 via a support bracket. 90° angle prism 72 is externally mirrored and has one inch square faces 66 and 70, FIG. 5 to function as a precise 90° mirror. Prism 72 is mounted on a kinematic mount and held in place by both an adhesive and a clamp provided with a nylon tip clamping screw. The kinematics mount provides tilt control in two axes enabling precise alignment of the leveling of the base of the prism so that the edge that faces the CCD camera is perfectly aligned. The kinematics mount is assembled through a post and post holder system to an x-y fine adjustment translation table that provides precise positioning of the prism in relation to the lens of the camera.

Also associated with the system shown in FIG. 6 are a controller/driver for the stepper motor turntable 74, a universal power supply with an input of 90 to 260 VAC at a frequency of 47 to 440 Hz to supply 5 VDC for the laser, 12 VDC for the camera, and 24 VDC for the controller and turntable. A reference position for turntable 74 is determined using a photosensor which detects a white line painted on a predetermined radius of the underside of the turntable tray. The photosensor is mounted on a small PC board where there is associated circuitry and this board is connected through a cable to the motor controller.

Figure 7:
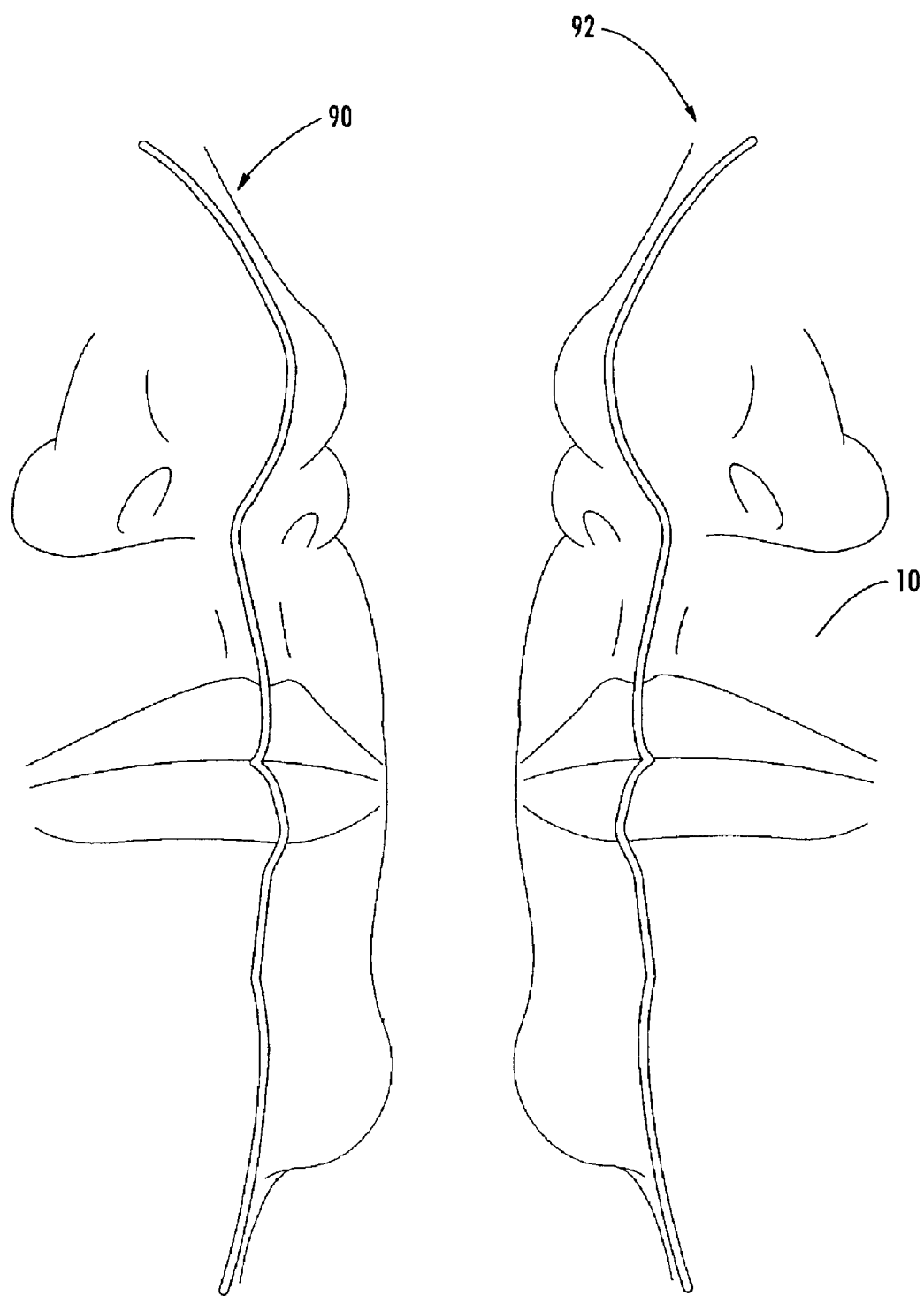
FIG. 7 is a view showing the image seen by the camera of the mensuration system of the subject invention with the laser line centered in the middle of the target.

FIG. 7 shows the dual images 90 and 92 viewed by camera 54, FIGS. 5 and 6 with the laser lines centered in the middle of target 10. Camera 54, FIGS. 5 and 6 is positioned on its side to make the best use of the available 640 horizontal and 480 vertical pixels. Note, however, that the system of this invention does not precisely spilt the camera's field of view into two separately defined images, but rather overlaps and fades the two images together. Typically, a darkened enclosure is included to eliminate any interference from other illumination sources. Therefore, the images of the two views may freely overlap because the object being measured is dark and no interference results. The images of the lines shown in FIG. 7, however, remain separable. This is carried out by a careful geometric design ensuring that over the full range of surface heights to be measured there is no overlap. When the target is rotated via turntable 74, FIGS. 5 and 6, image 92' is incomplete as shown at 94 due to feature 96 present on target 10. By using the two 90° faces of right angle prism 72, FIGS. 5 and 6 coated with highly reflective aluminum as mirrors to provide split frame imaging, the target is observed from both sides simultaneously. A 30° observation angle is used which provides both excellent precision and adequate measuring range.

Figure 8:
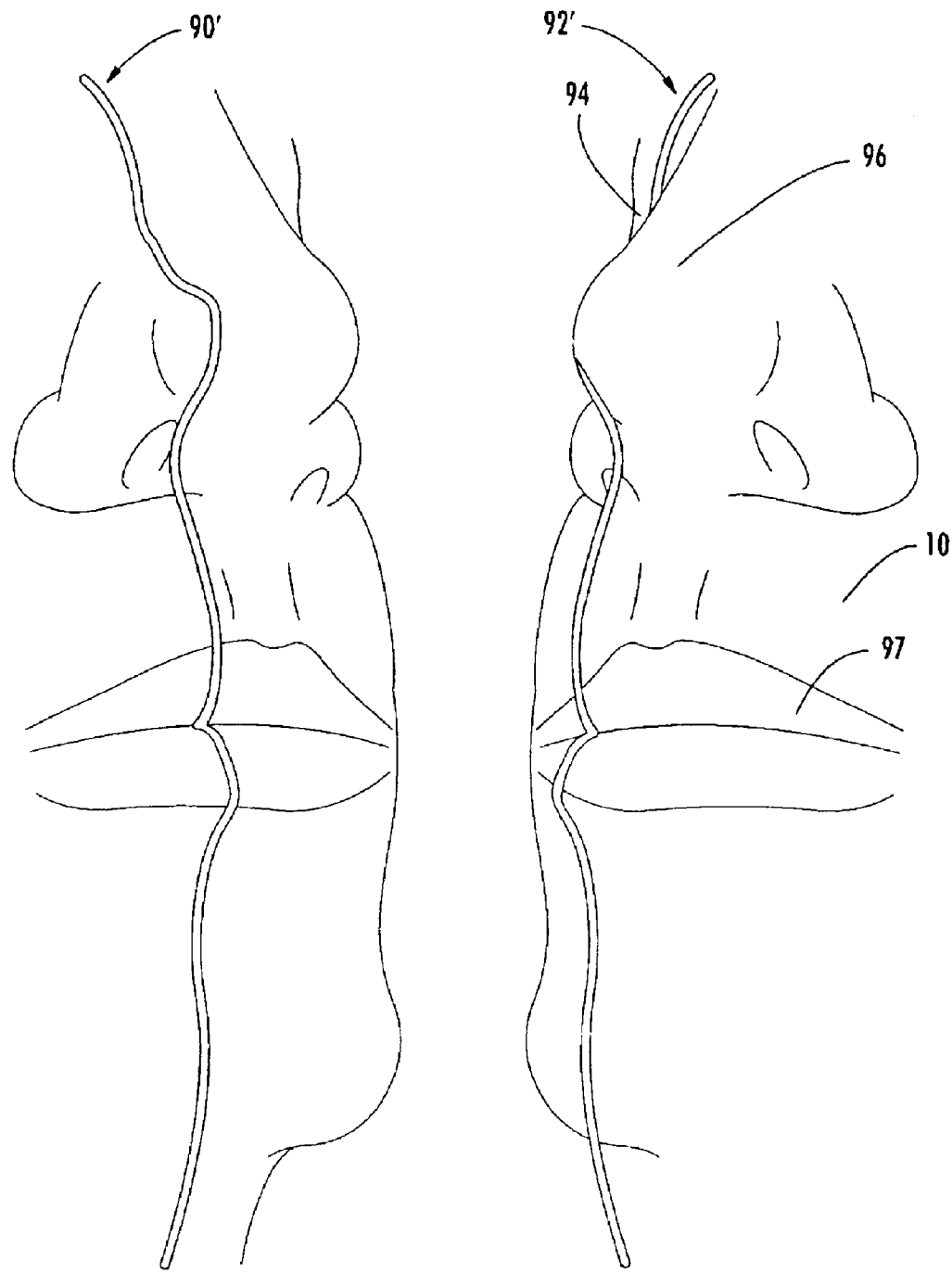
FIG. 8 is a view showing the image seen by the camera of the mensuration system of this invention with the target rotated and one view of the laser line shaded by a surface feature on the target.

The software associated with the system, discussed in reference to FIGS. 14–24, processes the split display, yielding two relatively independent measurements of the profile whenever shadowing does not occur and a single result when shadowing does occur as shown in FIG. 8. The system averages the results to improve accuracy whenever redundant measurements are available and uses a single result whenever shadowing occurs.

Figure 9:
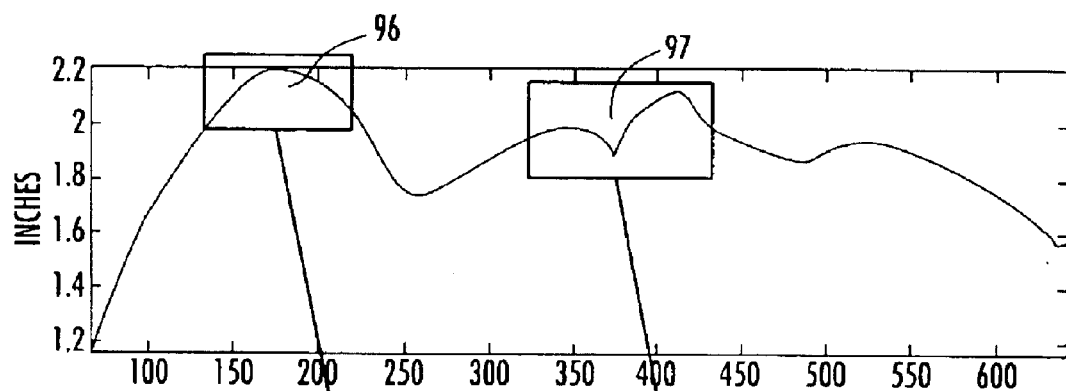
FIG. 9 is a graph showing the contours of the target depicted in FIGS. 7 and 8 measured by the non-contacting mensuration system of the subject invention.
Figure 10:
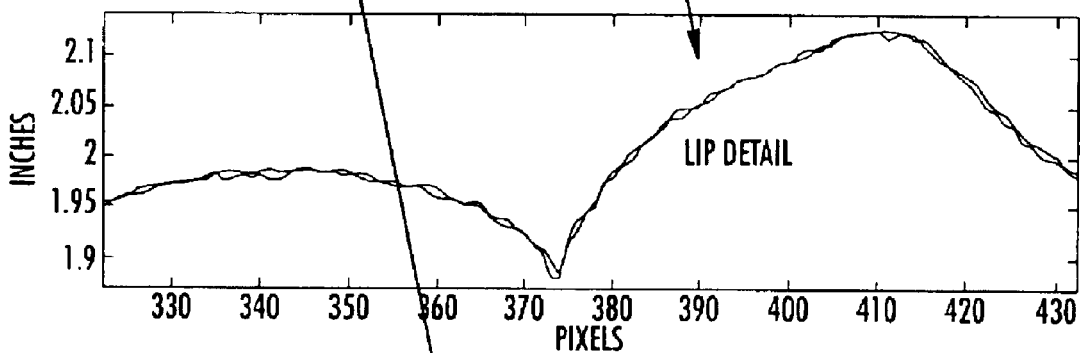
FIG. 10 is a graph showing in more detail one particular target surface feature measured by the non-contacting mensuration system of the subject invention.
Figure 11:
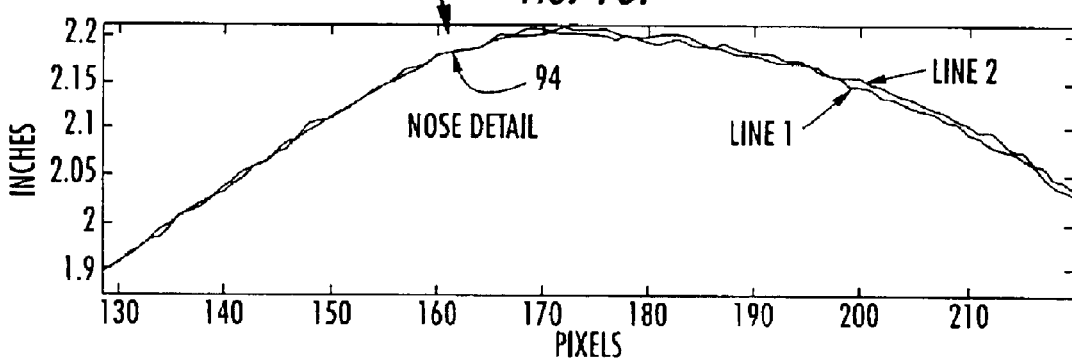
FIG. 11 is a graph showing in more detail another surface feature of the target shown in FIGS. 7 and 8 measured by the non-contacting mensuration system of the subject invention.
Figure 12:
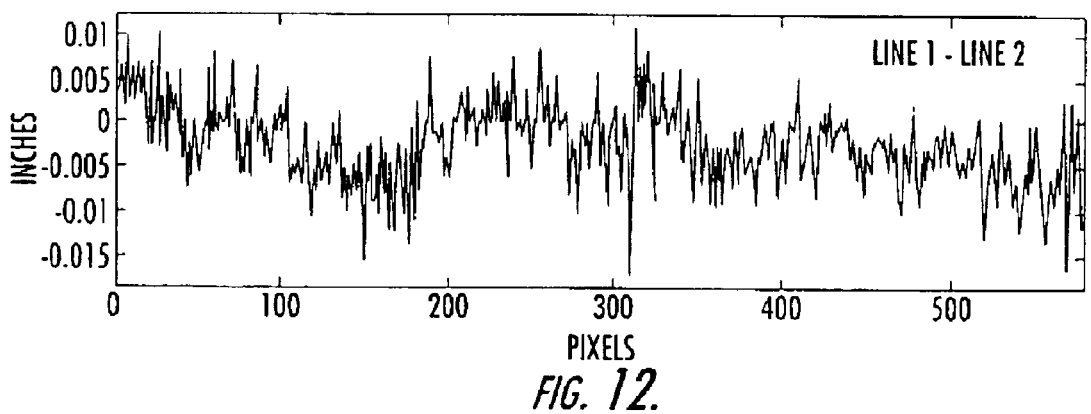
FIG. 12 is a graph showing the slight differences between the two profiles in accordance with the non-contacting mensuration system of the subject invention.
Figure 13:
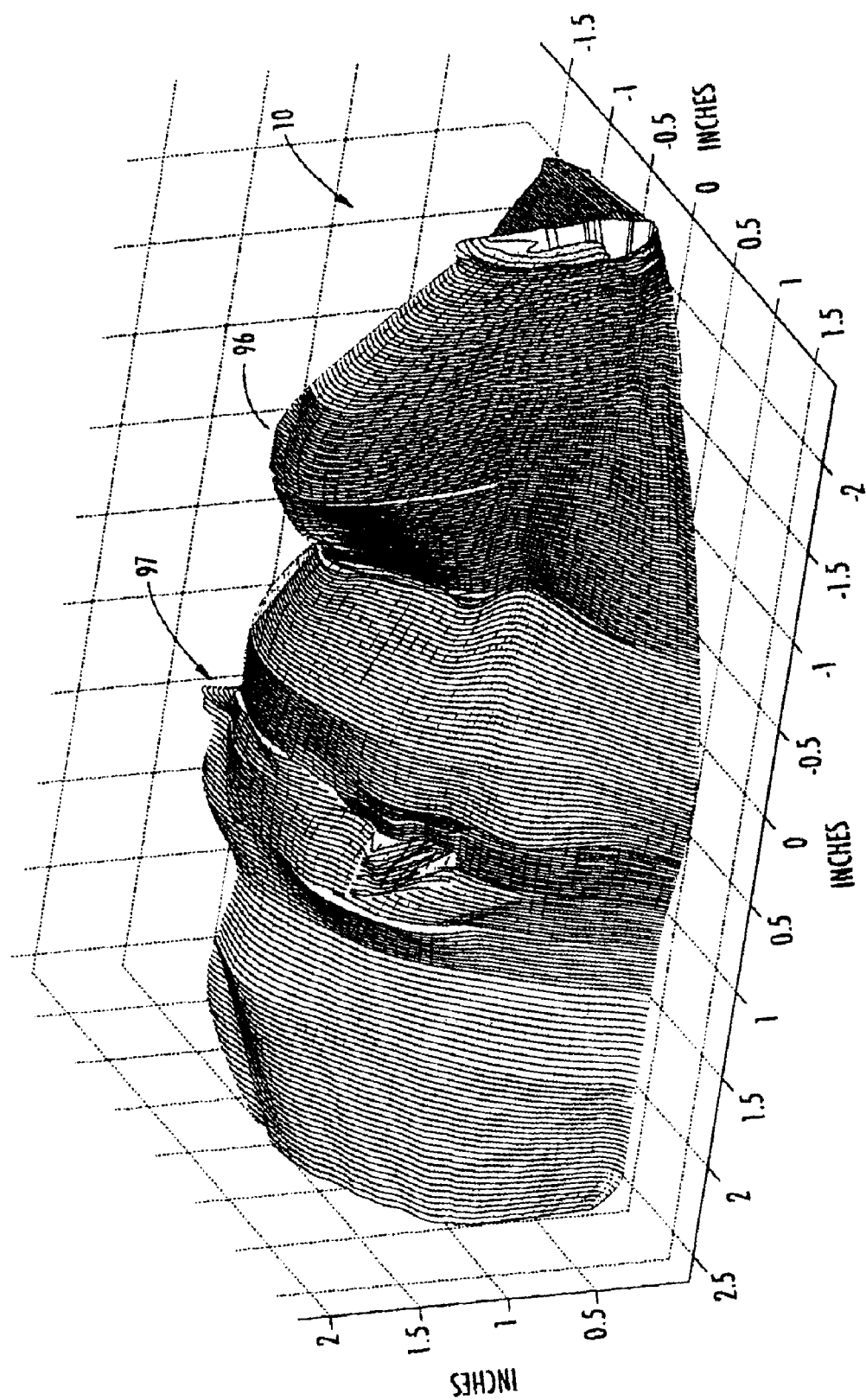
FIG. 13 is a depiction of a complete surface scan of the target shown in FIGS. 7 and 8 output by the non-contacting mensuration system of the subject invention.
Figure 14:
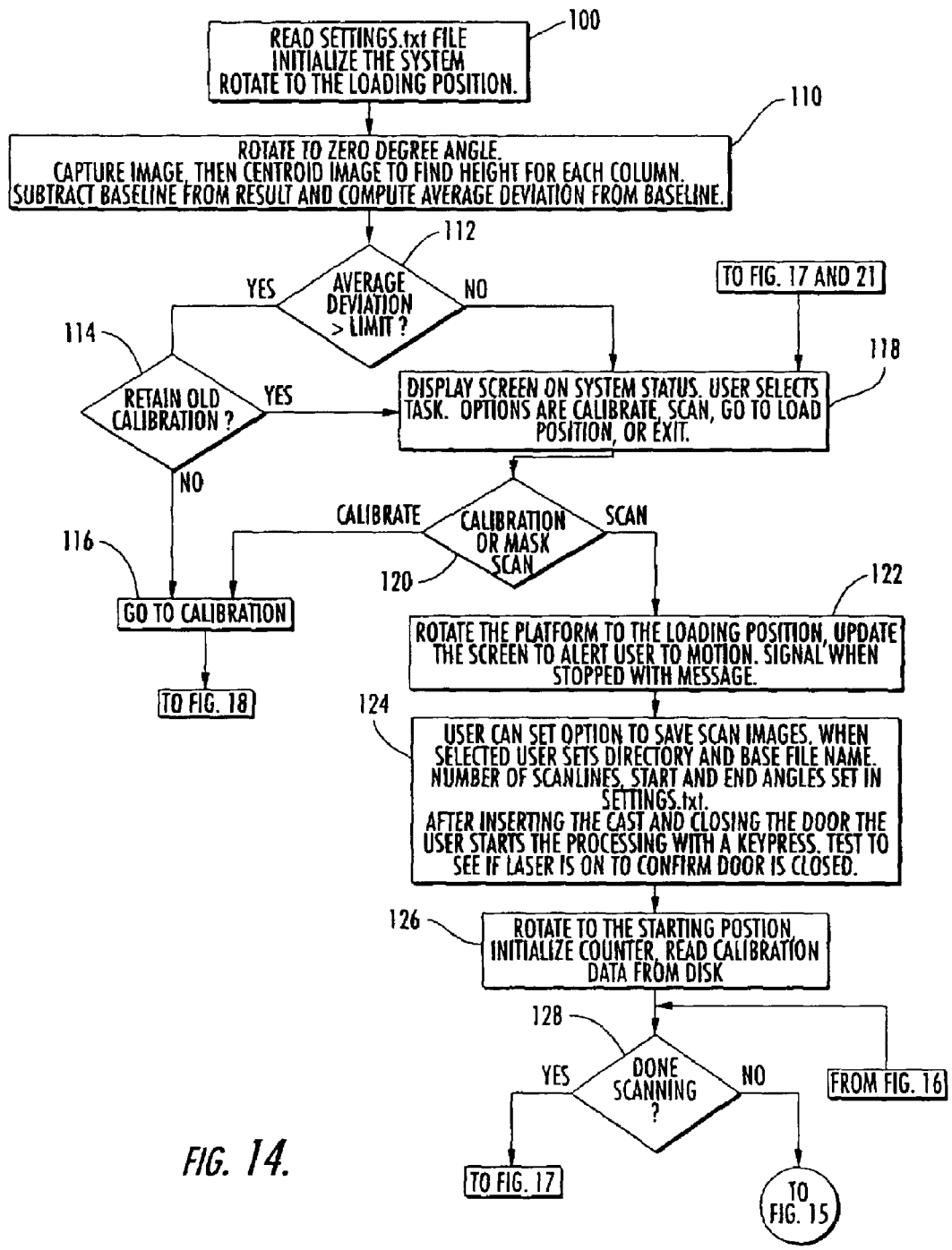
FIGS. 14–24 are flow charts depicting the primary steps associated with the non-contacting mensuration software in accordance with the subject invention.

FIGS. 9–11 shows the results obtained when processing a single trace of the profile of target 10 shown in FIGS. 5–8. Shadow causing feature 96 and feature 97 are shown in more detail in FIGS. 11 and 10, respectively. In all three figures, the horizontal axis is the pixel location and the vertical axis is the feature height in inches. Everywhere else, the system averages the two results to improve accuracy whenever redundant results are available. FIG. 9 shows the results obtained when processing a single trace of the profile of the lower half of the target demonstrating the excellent correspondence between the two simultaneous measurements. FIG. 13 shows a complete surface scan of the target, in this example, the casting of the lower half of the face shown in the previous figures. The resulting data can be used in one example, to manufacture an oxygen mask for a soldier or pilot.

FIGS. 14–24 depict the primary steps associated with the operation and programming of the non-contacting mensuration system of the subject invention. The system is initialized and turntable 74 is rotated to the loading position. Once a zero angle rotation degree is obtained, the image is captured and then the centroid is determined to find the height for each column. By subtracting the base line from the result, the average deviation from the base line is obtained, step 110. If the average deviation is below a predefined limit, step 112, the previous calibration settings may be retained, step 114 (or calibration can be accomplished again as shown at step 116) and the system displays on the output terminal the system status whereupon the user selects the appropriate task including calibration, scanning, loading, Go to load position, or exit, step 118. If calibration is not required, step 120, scanning is initiated by rotating the turntable platform to the loading position, updating the screen to alert the user to the motion, and providing a signal when stopped with a message step 122 ("Insert cast and close door and press start button").

In step 124, the system prompts the user to insert the cast. The user can set an option to save scan images by checking the box provided. When the option is selected, the user sets the directory and base file name. The program reads the number of scan lines, and the start and end angles from the computer disk file named "settings.txt". After inserting the cast and closing the door, the user starts the processing with a key press. The program then tests to confirm the laser is on and to confirm the enclosure door is closed.

In step 126, the platform holding the cast is next rotated to the starting position, the counter is initialized, and the program reads the calibration data from a disk file. Step 128 represents a decision as to whether all the scans have been completed for the current run, the counter is checked to see if all the scan images have been collected, if more images must be recorded the program proceeds to step 130, FIG. 15 in the flowchart. If all the scans have been completed the program proceeds to step 190, FIG. 17 in the flowchart.

Figure 15:
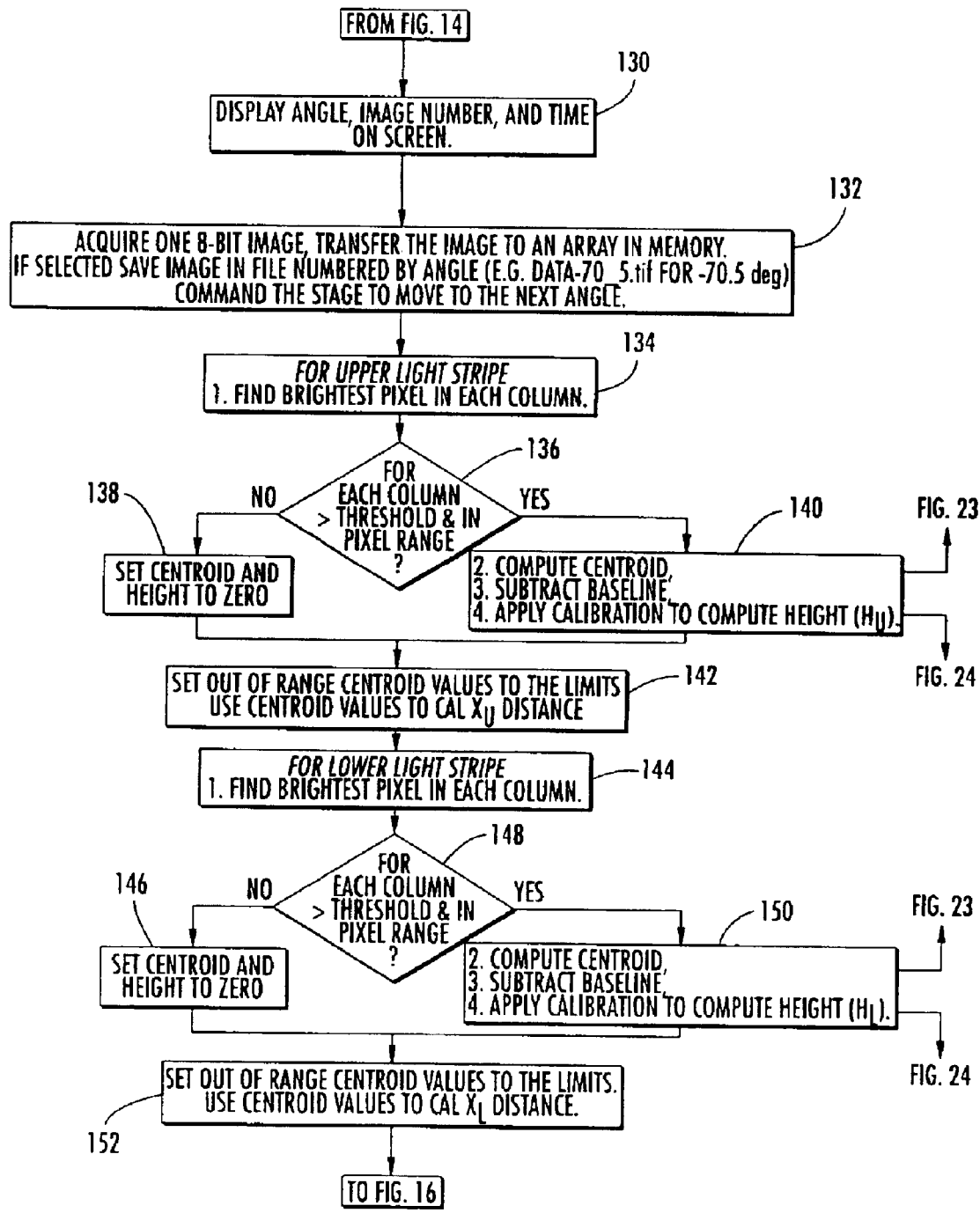

In step 130, FIG. 15, information is displayed on the screen so that the user can keep track of the current status of the scan. The displayed information consists of the angle of the stage, image number, and time. Next, in step 132, a single monochrome image with 8-bit intensity resolution is acquired by the frame grabber, this image is transferred to an array in the computer memory. If the option was previously selected by the user, the image is stored in file with the name determined by the current stage angle (e.g. data-70_5.tif for −70.5 degrees). Once this is complete, the stage is commanded to move to the next scan angle. This motion will continue while the acquired structured light data is processed.

Figure 23:
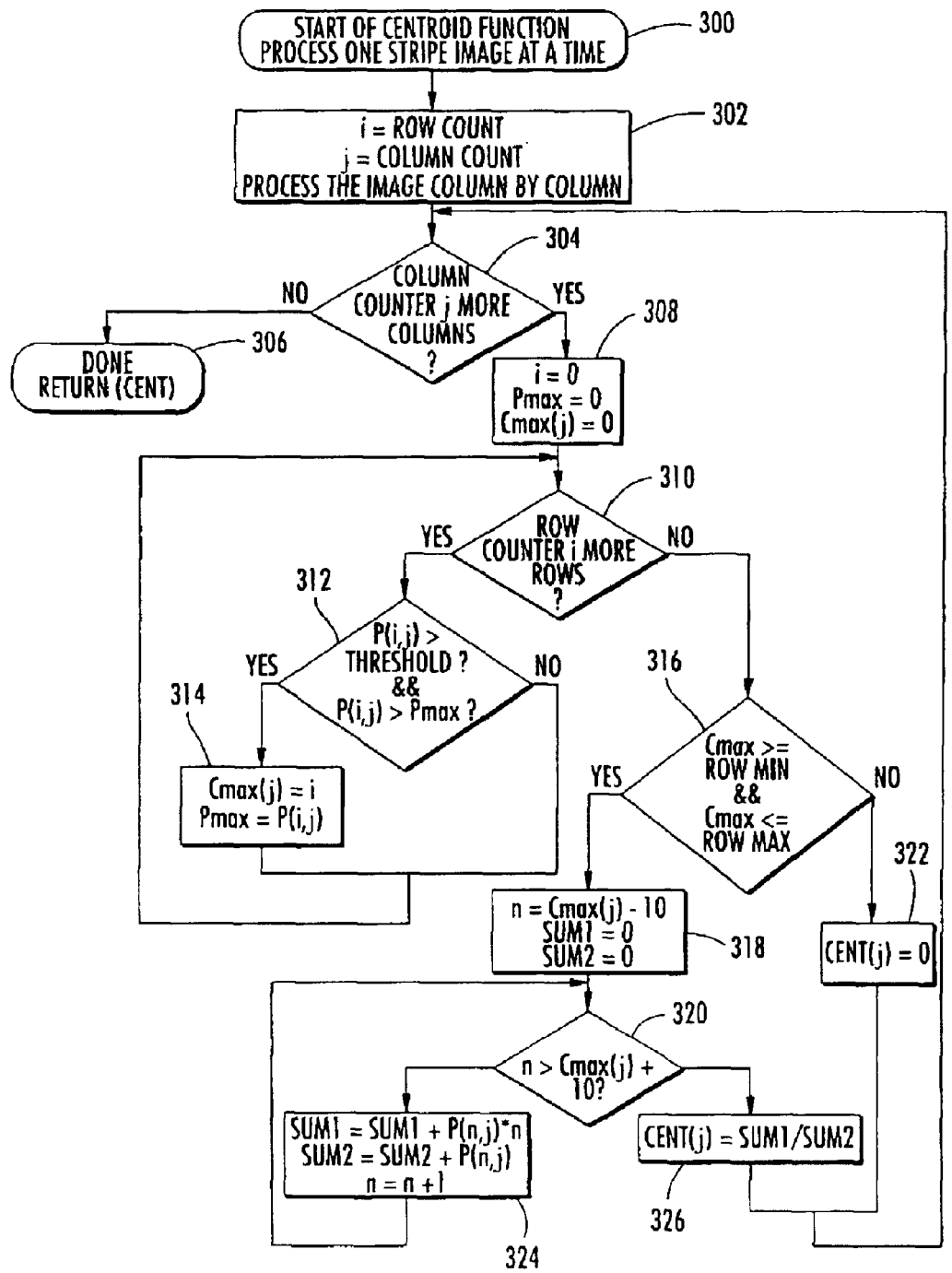
Figure 24:
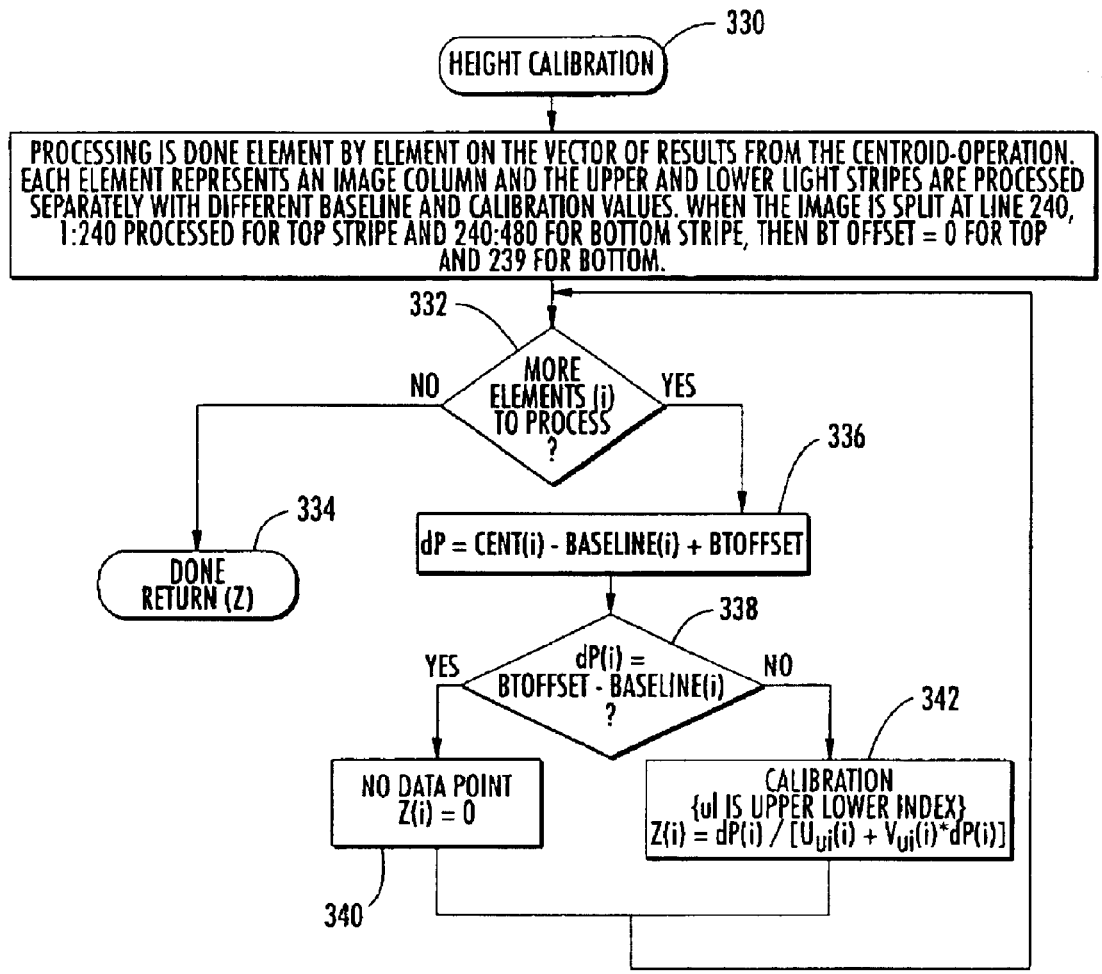

The processing of the image data to determine the height of the surface of the cast proceeds in the following fashion. In step 134 processing begins on the region of the image array in the computer memory containing the upper light stripe on the screen. During this step, the image is searched and the brightest pixel in each column is identified. Next, in step 136, is a decision: is the pixel in each column greater than a preset threshold indicating it represents valid data and is the pixel in a valid position within the image? If the data is valid, the program proceeds to step 140. If the data is below threshold or outside the valid position, the program continues at step 138. The program loops through each column in the image to complete this process. In step 138, the data in the column is invalid and therefore the location of the centroid of the light stripe in the image and the computed height of the cast are both set to zero. The program then proceeds to step 142. In step 140, the data is valid and the following operations take place. First, the centroid of the light stripe in the column is computed using the procedure detailed in FIG. 23. The centroid computation uses multiple pixels of variable brightness across the light stripe to estimate the center of the stripe with sub pixel accuracy. Next, the baseline light stripe position from a calibration measurement of the back plate alone is subtracted to determine the position of the stripe relative to the reference height. Finally, the height calibration detailed in FIG. 24 is applied to determine the height of the surface in that column of the upper image ($H_U$). The baseline and calibration data come from the stored calibration file. The program then proceeds to step 142, FIG. 15.

In step 142, the program checks the centroid values to verify that they fall within preset maximum and minimum values. Any centroid values that fall outside of range to the limits will be set to the corresponding maximum or minimum value. The centroid values are used together with calibration data to compute the x-axis position ($X_U$) of each column in the light stripe. In step 144, the program proceeds to process the region of the image array in the computer memory containing the Upper light stripe on the screen. During step 144, the image is searched and the brightest pixel in each column is identified. Next in step 148 is a decision: is the pixel in each column greater than a preset threshold indicating it represents valid data and is the pixel in a valid position within the image? If the data is valid, the program proceeds to step 146. If the data is below threshold or outside the valid position, the program continues at step 150. The program loops through each column in the image to complete this process. In step 146, the data in the column is invalid therefore the location of the centroid of the light stripe in the image and the computed height of the cast are both set to zero. The program proceeds to step 152. In step 150, the data is valid and the following operations take place. First, the centroid of the light stripe in the column is computed using the procedure detailed in FIG. 23. The centroid computation uses multiple pixels of variable brightness across the light stripe to estimate the center of the stripe with sub pixel accuracy. Next, the baseline light stripe position, from a calibration measurement of the back plate alone, is subtracted to determine the position of the stripe relative to the reference height. Finally, the height calibration detailed in FIG. 24 is applied to determine the height of the surface in that column of the lower image ($H_L$). The baseline and calibration data come from the stored calibration file. The program then proceeds to step 152, FIG. 15.

The centroid values are checked, step 152, to verify that they fall within preset maximum and minimum values. Any centroid values that fall outside of range to the limits will be set to the corresponding maximum or minimum value. The centroid values are used together with calibration data to compute the x-axis position ($X_L$) of each column in the light stripe.

Figure 16:
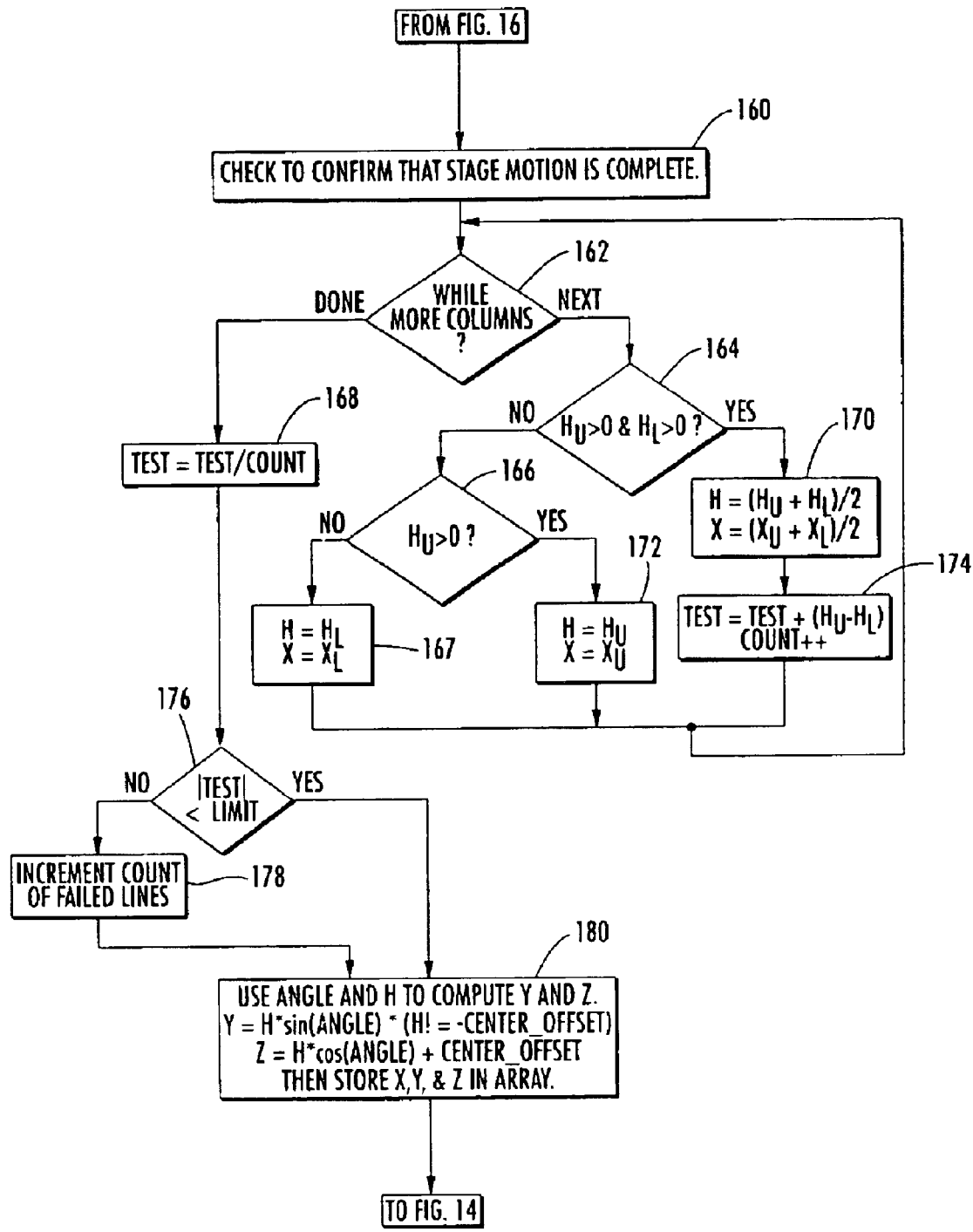
Figure 17:
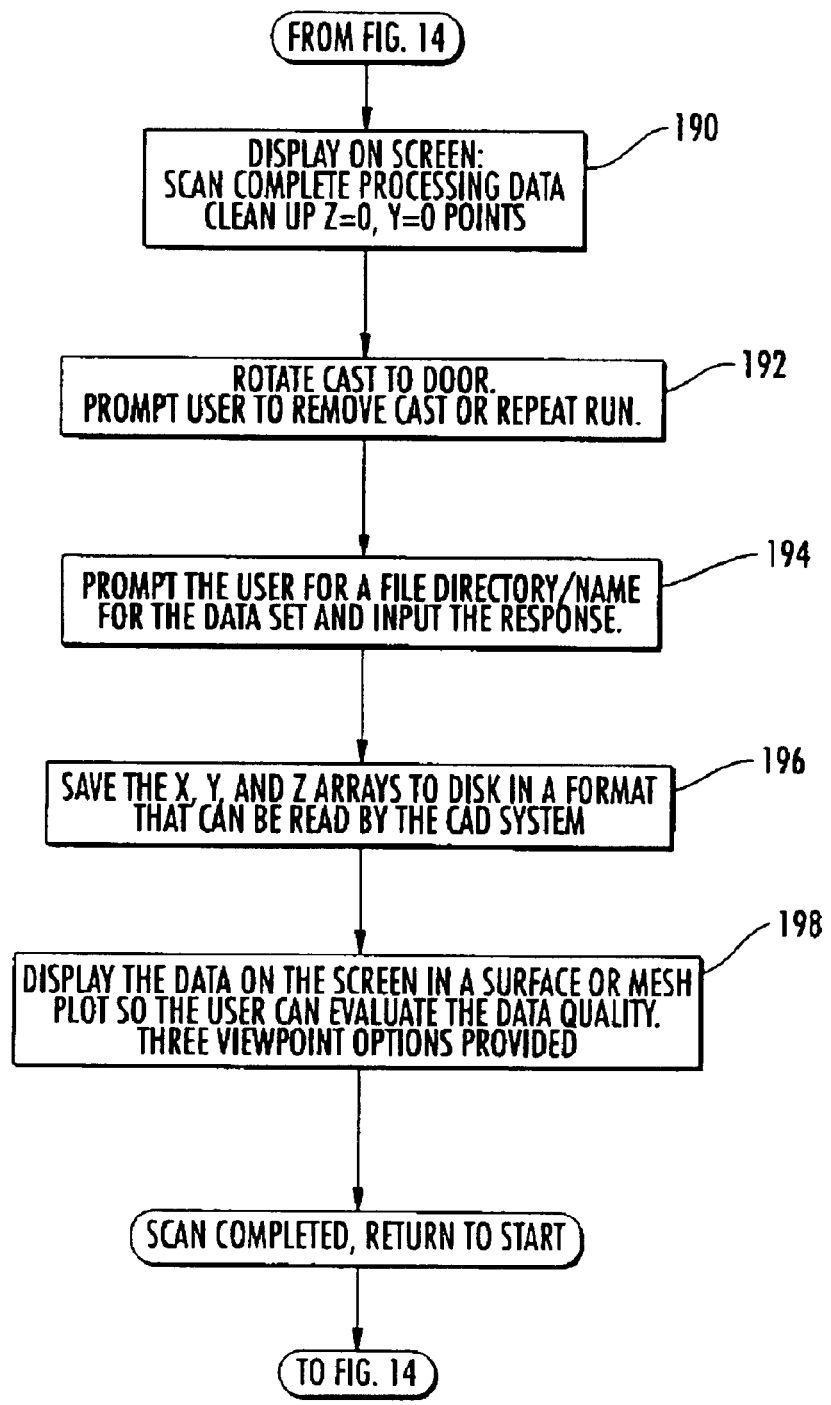

In step 160, FIG. 16, the program verifies that the scan motion initiated in step 132 is complete. If the stage is still in motion, the program waits at this step until it is completed. Step 162 is a decision—if more columns remain to be processed, the program proceeds to step 164, however if no additional columns remain, the flow is directed to step 168. Steps 164, 166, 167, 170, 172, and 174 define the operations that are used to combine the data from the upper and lower images to produce the height (H) and longitudinal (X) positions. These operation average the values together if two legitimate values exist or take the available valid data point when only one legitimate value exists. In step 164 a decision is made—if both the $H_U$ and $H_L$ values are greater than zero—proceed at step 170, otherwise, if one of these values is zero, proceed with step 166. In step 166 another decision is made: if the $H_U$ value is greater than zero, proceed to step 172, otherwise, proceed with step 167. In step 167, set variable H=$H_L$ and variable X=$X_L$; then return to step 162. In step 172, set variable H=$H_U$ and variable X=$X_U$; then return to step 162. In step 172 both values are valid so take the average as follows, set variable H=($H_U$+$H_L$)/2 and variable X=($X_U$+$X_L$)/2. In step 174, the difference between the heights from the upper and lower images are computed and then summed with previous values from the current angle as follows, variable Test=Test+($H_U$-$H_L$). A count of the number of points included in the sum is then incremented (count++). When this is complete processing returns to step 162. In step 168 the average value of the difference in height between the upper and lower estimates of the surface height is computed, Test=Test/count.

Step 176 is a decision wherein the magnitude of the surface height difference computed in step 168 is compared to a limit defined in the Settings.txt file, |Test|<Limit. If the magnitude is less than the limit, proceed to step 180, if not go to step 178. In step 178, the count of the number of lines that failed the test in 176 is incremented. In step 180, the scan angle and height value (H) are used to compute the Y-axis and Z-axis values for each pixel as follows. Y=H*sin(angle)*(H !=−center_offset) and Z=H*cos(angle)+center_offset. Then the X, Y, & Z values, which completely define each point on the surface in Cartesian coordinates, are stored in an array in the computer's memory. Control now returns to step 128, FIG. 4 where the decision will be made to either process the next scan angle or be ultimately directed to step 190, FIG. 17 if the scan is complete.

In step 190, first display on the computer screen, "Scan Complete, Processing Data". Then clean up locations where Z=0 and Y=0 by estimating the correct X and Y coordinates so that the Z=0 value will fall in the correct location on the surface plot. In step 192, the program rotates the stage to bring the cast to the door of the enclosure. The user is prompted to either remove the cast or repeat the scan.

The number of lines that failed the upper-lower measurement difference test and the total number of scan lines are displayed on the computer screen. The program recommends that the user consider recalibration if a specified number of allowed scan lines, specified in the Settings.txt file is exceeded.

Step 194 prompts the user for a file directory and name for the newly acquired data set and accepts the response from the User. In step 196, the X, Y, and Z arrays are saved in the disk file in a format that can be read by the CAD (computer aided design) system. Finally, in step 198, the scan data is displayed on the screen in a surface or mesh plot so that the user can evaluate the data quality. Three viewpoint options are provided which the user can select. The scan is now complete and program control returns to Step 118, FIG. 14.

Figure 18:
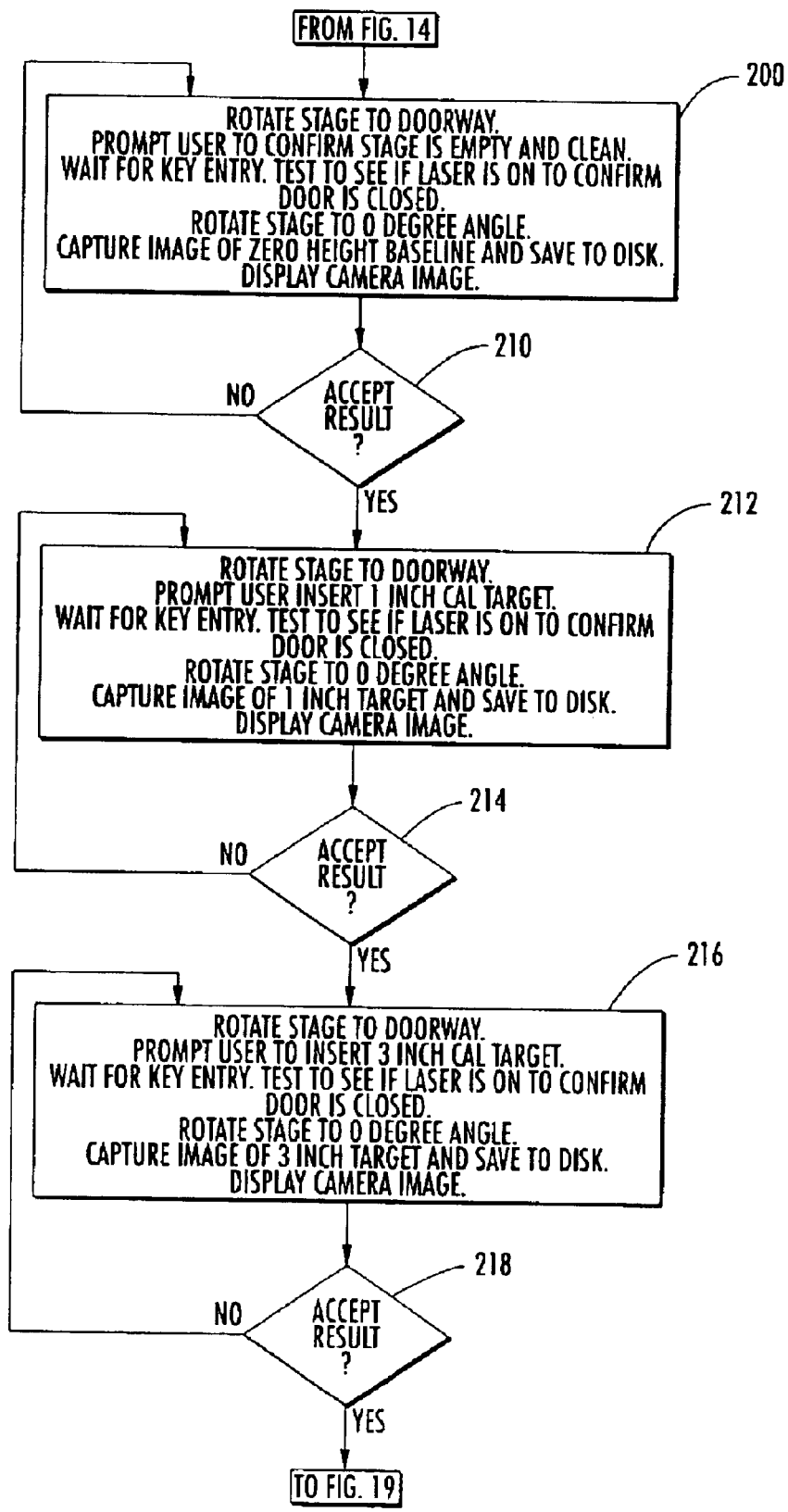

The calibration routine, FIG. 18, ensures the system is calibrated after it is first set up and the calibration data is stored in a disk file. The calibration only needs to be updated when the measurement accuracy decreases, which will be detect by the measurement of the difference in the two scan lines computed in steps 168 and 176, FIG. 16.

Step 200, FIG. 18 begins the calibration process by collecting data from the supplied calibration targets and saving the data to disk. First, the stage is rotated to the loading position at the enclosure doorway. Then a message is displayed on the computer screen to instruct the user to confirm stage is empty and clean. The bare backplane provides a zero height reference level. The program wait for a key entry from the user then it tests to confirm that the laser is turned on and that the door is closed and latched. Once this is confirmed, the program rotates the stage to the zero degree angle. When motion is stopped an image of the light stripe on the zero height baseline is captured and saved to disk. Finally, the camera image is display to allow the User to verify that it is satisfactory.

Step 210 is a decision point, the user is asked to accept the zero height calibration image. If the image is unacceptable (typically because the stage wasn't cleared) the program returns to step 200 and repeats the process. If the image is acceptable, the program continues on to step 212. Step 212 continues the calibration process by collecting data from the next calibration target and saving the data to disk. First, the stage is rotated to the loading position at the enclosure doorway. Then a message is displayed on the computer screen to instruct the user to insert the one-inch high calibration target. The program wait for a key entry from the user then it tests to confirm that the laser is turned on and that the door is closed and latched. Once this is confirmed, the program rotates the stage to the zero degree angle. When motion is stopped an image of the light stripe on the one-inch high calibration target is captured and saved to disk. Finally, the camera image is display to allow the user to verify that it is satisfactory. Step 214 is a decision point wherein the user is asked to accept the one-inch high calibration image. If the image is unacceptable (typically because the wrong target was in place) the program returns to step 212 and repeats the process. If the image is acceptable, the program continues on to step 216. Step 216 continues the calibration process by collecting data from the next calibration target and saving the data to disk. First, the stage is rotated to the loading position at the enclosure doorway. Then a message is displayed on the computer screen to instruct the user to insert the three-inch high calibration target. The program wait for a key entry from the user then it tests to confirm that the laser is turned on and that the door is closed and latched. Once this is confirmed, the program rotates the stage to the zero degree angle. When motion is stopped an image of the light stripe on the three-inch high calibration target is captured and saved to disk. Finally, the camera image is display to allow the user to verify that it is satisfactory. Step 218 is a decision point wherein the user is asked to accept the three-inch high calibration image. If the image is unacceptable (typically because the wrong target was in place) the program returns to step 216 and repeats the process. If the image is acceptable, the program continues on to step 220.

Figure 19:
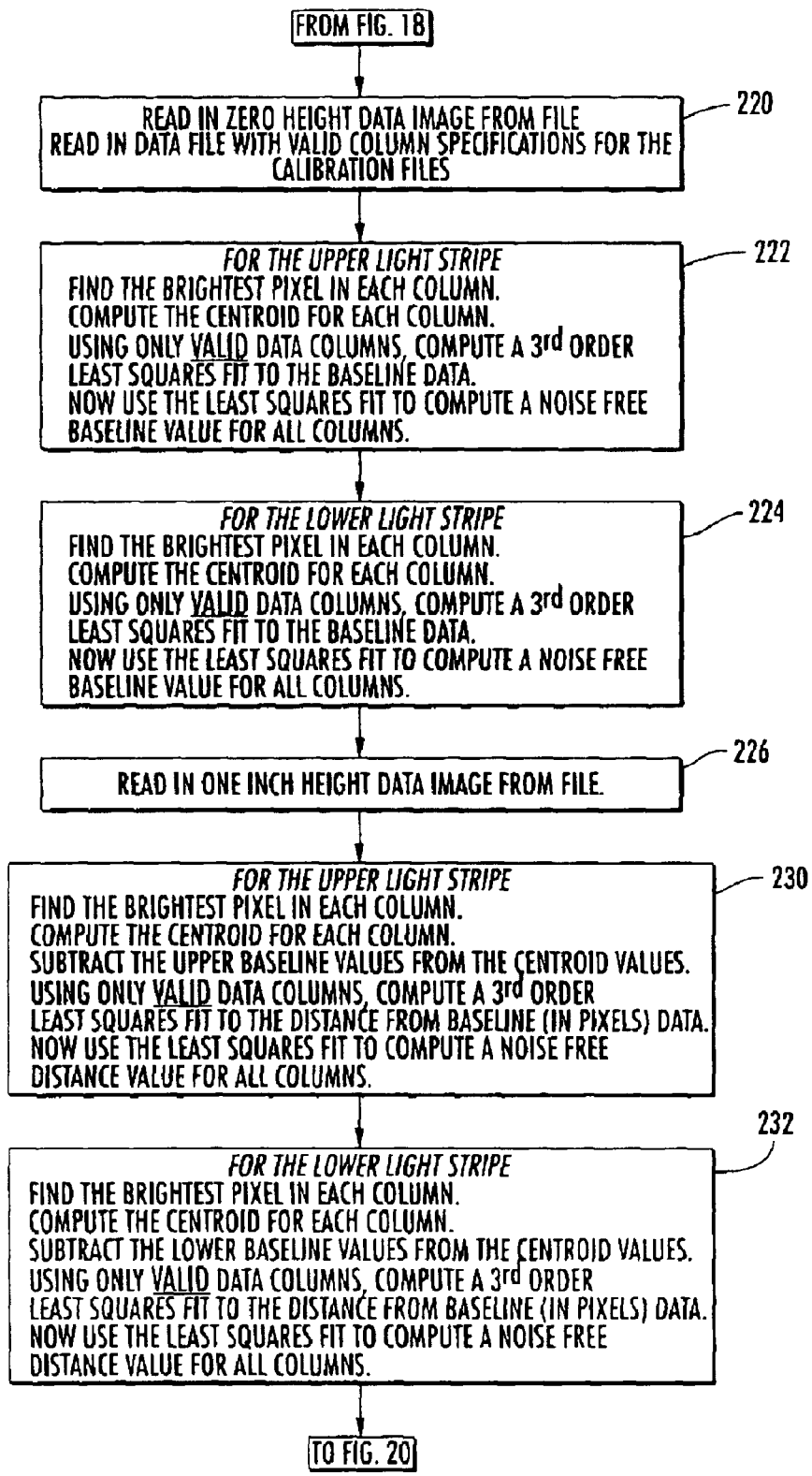

In Step 220, FIG. 19, the processing of the stored calibration images begins. The zero height calibration image is read into memory from the file in which it was previously stored. Then the valid column specifications for the calibration files are read from the "Settings.txt" file. In step 222, the upper light stripe in the zero height calibration image is processed. The brightest pixel in each valid column of the upper image is identified. Then the centroid routine detailed in FIG. 23 is applied to compute the centroid for each column. Using only valid data columns, the program computes a third-order least squares fit to the baseline data. Lastly, the program uses the least squares fit to compute a noise free zero-height baseline value for all columns. In step 224, the lower light stripe in the zero height calibration image is processed. The brightest pixel in each valid column of the lower image is identified. Then the centroid routine detailed in FIG. 23 is applied to compute the centroid for each column. Using only valid data columns, the program computes a third-order least squares fit to the baseline data. Lastly, the program uses the least squares fit to compute a noise free zero-height baseline value for all columns. In step 226, the one-inch high calibration image is read into memory from the file in which it was previously stored. In step 230, the upper light stripe in the one-inch high calibration image is processed. The brightest pixel in each valid column of the upper image is identified. Then the centroid routine detailed in FIG. 23 is applied to compute the centroid for each column. Using only valid data columns, the program computes a third-order least squares fit to the one-inch high data. Lastly, the program uses the least squares fit to compute a noise free one-inch high distance value for all columns. In step 232, the lower light stripe in the one-inch high calibration image is processed. The brightest pixel in each valid column of the lower image is identified. Then the centroid routine detailed in FIG. 23 is applied to compute the centroid for each column. Using only valid data columns, the program computes a third-order least squares fit to the one-inch high data. Lastly, the program uses the least squares fit to compute a noise free one-inch high distance value for all columns.

Figure 20:
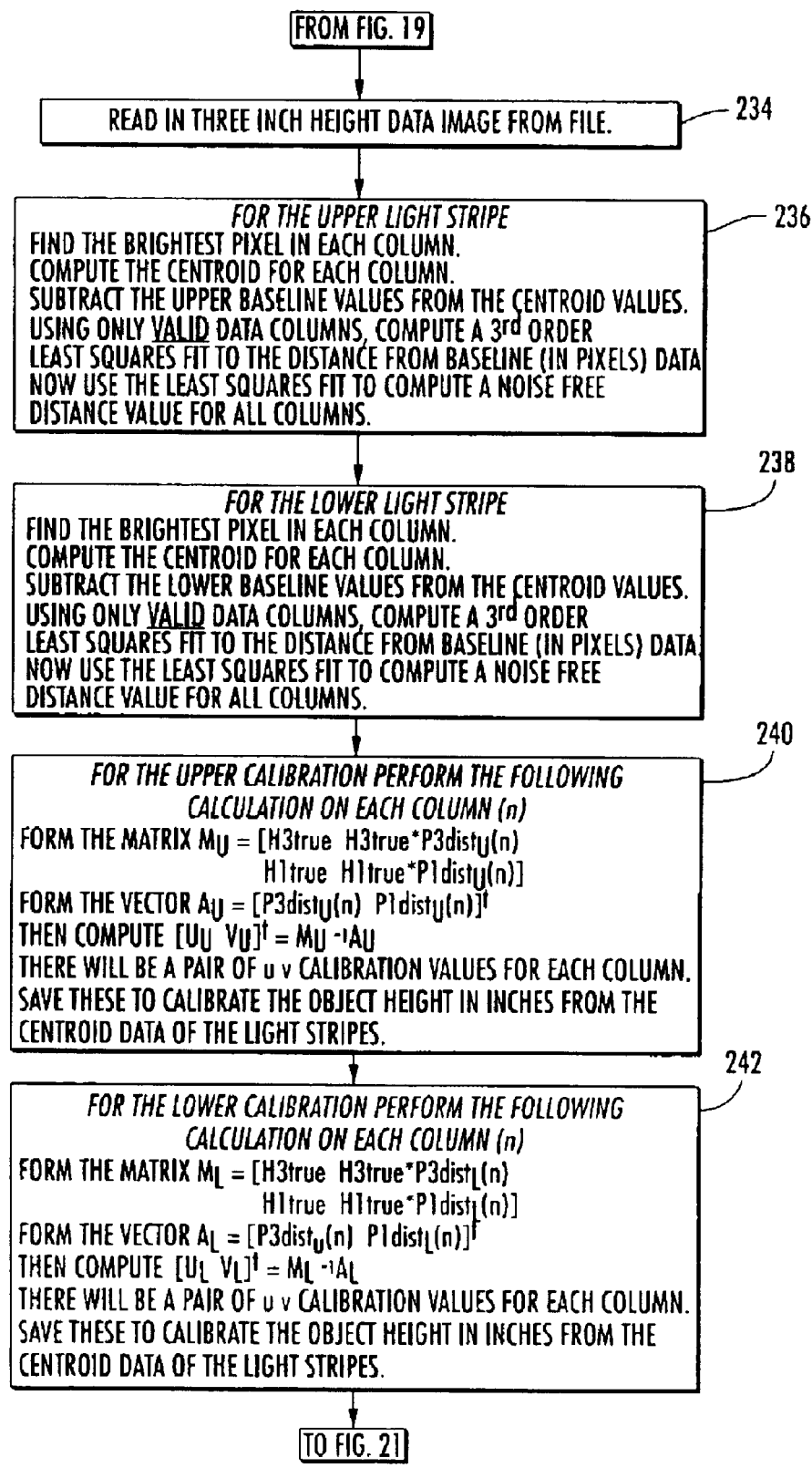

In step 234, FIG. 20, the three-inch high calibration image is read into memory from the file in which it was previously stored. In step 236, the upper light stripe in the three-inch high calibration image is processed. The brightest pixel in each valid column of the upper image is identified. Then the centroid routine detailed in FIG. 23 is applied to compute the centroid for each column. Using only valid data columns, the program computes a third-order least squares fit to the three-inch high data. Lastly, the program uses the least squares fit to compute a noise free three-inch high distance value for all columns. In step 238, the lower light stripe in the three-inch high calibration image is processed. The brightest pixel in each valid column of the lower image is identified. Then the centroid routine detailed in FIG. 23 is applied to compute the centroid for each column. Using only valid data columns, the program computes a third-order least squares fit to the three-inch high data. Lastly, the program uses the least squares fit to compute a noise free three-inch high distance value for all columns. In step 240 the calibration values for the upper screen image are calculated by performing the following calculation on each column (n) in the image.

Form the matrix $M_U = [H3\text{true}\ H3\text{true}*P3\text{dist}_U(n)\ H1\text{true}\ H1\text{true}*P1\text{dist}_U(n)]$;

form the vector $A_U = [P3\text{dist}_U(n)\ P1\text{dist}_U(n)]^T$; and then compute $[u_U\ v_U]^T = M_U^{-1} A_U$ where H3true is the exact measured height of the three-inch high calibration target, H1true is the exact measured height of the one-inch high calibration target, P3dist$_U$(n) is the difference in measured three-inch pixel position processed in step 236 by taking the centroid of the calibration light stripe subtracting the baseline level then removing the noise using a third-order least squares fit, and P1 dist$_U$(n) is the difference in measured one-inch pixel position processed in step 230 by taking the centroid of the calibration light stripe subtracting the baseline level then removing the noise using a third-order least squares fit.

There will be a pair of u v calibration values for each column. These u v values are saved to use in calibrating the object height in inches from the centroid data of the light stripes. In step 242, the calibration values for the upper screen image are calculated by performing the following calculation on each column (n) in the image.

Form the matrix $M_L=[H3\text{true } H3\text{true}*P3\text{dist}_L(n) \ H1\text{true } H1\text{true}*P1\text{dist}_L(n)]$;

form the vector $A_L=[P3\text{dist}_L(n) \ P1\text{dist}_L(n)]^T$; and then compute $[u_L v_L]^T = M_L^{-1} A_L$ where H3true is the exact measured height of the three-inch high calibration target, H1true is the exact measured height of the one-inch high calibration target, P3dist$_L$(n) is the difference in measured three-inch pixel position processed in Step 238 by taking the centroid of the calibration light stripe subtracting the baseline level then removing the noise using a third-order least squares fit, and $P_1$ dist$_L$(n) is the difference in measured one-inch pixel position processed in Step 232 by taking the centroid of the calibration light stripe subtracting the baseline level then removing the noise using a third-order least squares fit. There will be a pair of u v calibration values for each column. These u v values are saved to use in calibrating the object height in inches from the centroid data of the light stripes.

Figure 21:
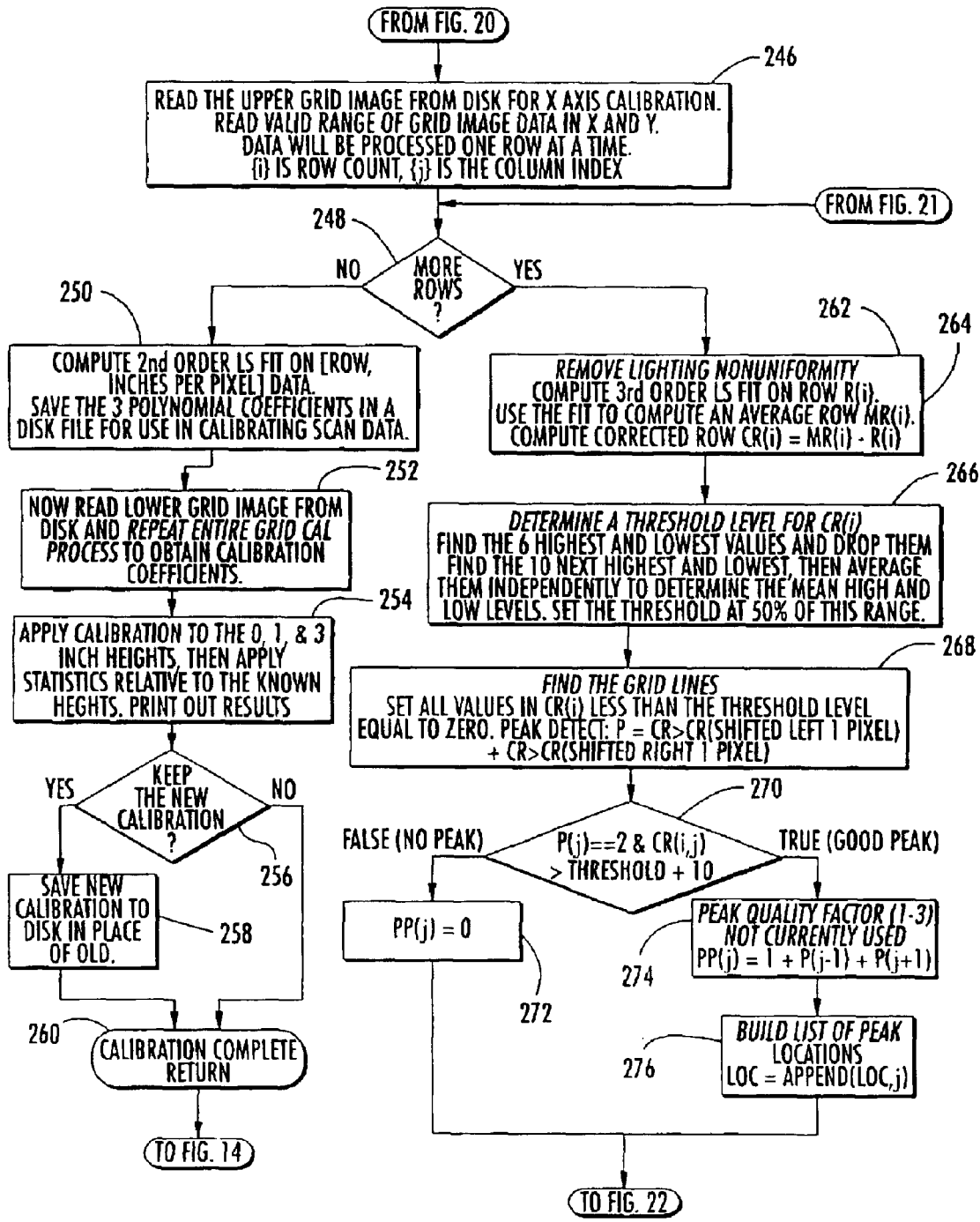

Step 246, FIG. 21, begins the process of computing the X axis calibration. This is done to compensate for the distortion in apparent X axis position caused by the height of the surface of the cast. An image of a grid pattern with 5 lines per inch is stored on the computer's disk. This image only needs to be updated when a full system realignment is performed, therefore there is no automatic provision in the software for capturing new images of the grid. In step 246 the computer first reads the upper grid image from disk for X axis calibration. Then the valid range of pixels, in both X and Y coordinates, is read form the Settings.txt file. The data will be processed one row at a time, {i} specifies the row index and {j} specifies the column index. Step 248 is a decision: are there more rows to process? If there are more rows, proceed to step 262, if no additional rows remain, the program moves to step 250. In step 262, any lighting nonuniformity in the grid image is removed. First a third-order least squares fit is calculated for the data in row R(i). The least squares fit coefficients are next used to calculate the pixel values for an average noise free row MR(i), where i is the row index variable. The data is then corrected for lighting nonuniformities by calculating a corrected row CR(i)=MR(i)−R(i). In step 266, a threshold level is determined for the CR(i) data that will be used to detect the black threshold lines against the white background. First find the 6 highest and lowest pixel values in the row and drop them. Then find the 10 next highest and lowest pixel values and average them independently to determine the mean high and low levels. The threshold is set at 50% of the range between the mean high and mean low pixel values. In step 268, the gridlines are located in the image. First all values in CR(i) less than the threshold level are set equal to zero. Then a peak detection algorithm is applied because the grid line images are wider than a single pixel. Calculate the following quantity (P) that will be equal to 2 for pixels that are greater than their neighbors to the left and right P=CR>CR(shifted left 1 pixel)+CR>CR(shifted right 1 pixel). Step 270 is a decision on each threshold computation. If P(j) equals 2 and the pixel values exceeds the threshold by at least 10 units (CR(i,j)>thresh+10) then the data is a grid line center and the program proceeds to step 276. If both of these conditions are not true it is not a grid line center and the program proceeds to step 272. If reaching step 273, the pixel is not a grid center and is therefore set to zero (PP(j))=0). The program now moves to step 280. Step 276 computes a Peak Quality Factor (1–3) which is no longer used in subsequent processing (PP(j))=1+P(j−1)+P(j+1)). In step 278 a list of peak locations is built by adding the new location to an array (Loc) in the computer's memory. The program now moves to step 280.

Figure 22:
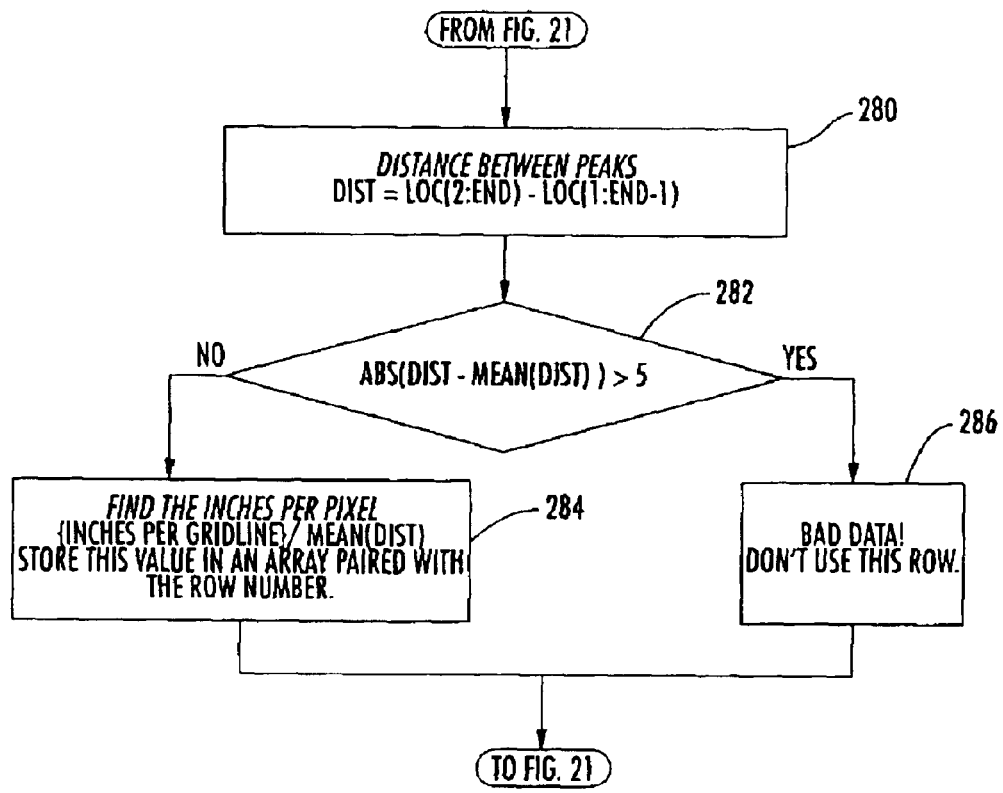

In step 280, FIG. 22, the distance between peaks of the grid lines is calculated. Using vector calculation notation, the values of the location vector (Loc) are shifted and then subtracted forming a vector of the distances between peaks (Dist) as follows: Dist=Loc(2:end)−Loc(1:end−1). Step 282 is a decision used to detect rows containing bad data. First, all values in the vector (Dist) are averaged to find the mean distance between grid lines. Then the mean is subtracted from each element in the vector (Dist) the absolute value is taken and each of these magnitudes are then tested to see if they are greater than 5, abs(Dist−mean(Dist))>5. If any value is greater than 5 proceed to step 286, while if all the values are less than or equal to 5 go to step 284. If the program moves to step 284, the data in this row of pixels from the grid is good, now compute the number of inches per pixel, using the known constant of 0.2 inches per gridline, {0.2 inches per gridline}/mean(Dist). Store this value in an array in the computer's memory paired with the row number. The program now loops back to step 248 to process the next row. If the program moves to step 286, the test has failed and this row contains bad data and is discarded. The program now loops back to step 248 to process the next row.

Step 250 follows from step 248 when the processing of all rows of the grid image is complete. Now the longitudinal distance calibration must be completed. The software calculates the second-order least squares fit to the data array containing the pixel row number and the inches per pixel data. The three polynomial coefficients from the second-order least squares fit are saved in a disk file for use in calibrating future scan data. Step 252 is not really a simple step but a placeholder for the grid calibration process on the lower grid Image. The calibration process previously described, which ran from steps 246 through 286, is repeated on the lower grid image. This provides three calibration coefficients for the data displayed in the lower half of the computer's screen. Step 254 is a test on the new calibration coefficients. The new height calibrations are applied to the data from the 0, 1, and 3 inch calibration targets, then statistics are calculated relative to the known heights. Heights are calculated at each pixel along the light stripe and the mean value and standard deviations are calculated for each calibration target. The mean values represent accuracy and should fall within a very small margin of the known true height. The standard deviations present the random error in the reading and must be a small value when the system is working properly. In step 256, the user has the opportunity choose to accept or reject the new calibration values based on the statistics presented in step 254. Pressing on the accept or reject buttons on the computer screen makes the selection. If the calibration is accepted proceed to step 258. If it is rejected the data will not be saved to disk, the prior calibration remains, and control proceeds to step 260. Step 258 the user has elected to use the new calibration. The new calibration data is now saved to the disk in place of the previous data. If the new calibration is not accepted the old calibration is retained and the program proceed to step 260. The calibration process is now complete, return to step 118, FIG. 14.

FIG. 23 provides detail on the operation called out in step 140, FIG. 15 for computing the centroid on the light stripe image. The light stripe is several pixels wide with the brightest pixels in the center and the irradiance level fades toward either edge of the stripe. The actual light distribution is continuous, but when imaged with the camera and digitized this is broken into a number of discrete levels. The centroid algorithm uses the information in this digitized distribution to estimate the true center of the distribution, which is also the center of the light stripe. This centroid estimation has sub-pixel accuracy, which significantly enhances the accuracy of the surface height measurement.

Step 300, FIG. 23 represents the entry point to the start of the centroid function. Note that the following steps apply to a single light stripe and this process must be repeated to process all the images in the scan data set. Step 302 defines the counter variables used in this process, i represents the row count and j represents the column count. The light stripe image will be processed column by column. The light stripe is horizontal across the image so each column represents a transverse cut through the light stripe. Step 302 represents a decision, the column counter j is evaluated to see if more columns remain to be processed. If no more columns remain, proceed to step 306, otherwise proceed to step 308 to process more columns. The centroid calculation is complete, return to the calling routine in the program. Step 308 there are more columns to process, clear the following variables i=0, Pmax=0, Cmax(j)=0. Step 310 represents a decision wherein the row counter (i) is evaluated to see if more rows remain to be processed. If no more rows remain, proceed to step 316, otherwise proceed to step 312 to process the next row. Step 312 represents a decision. Is the current pixel (row i, column j) greater than a threshold value set in the file Settings.txt, (P(i,j)>Threshold) and is the current pixel greater than the maximum amplitude pixel (P(i,j)>Pmax) for the current row being processed? If both conditions are true, we have a new maximum pixel, proceed to step 314. If either of the conditions are not true, proceed to step 310 to process the next row. Step 314 updates the maximum pixel by saving its location in Cmax, (Cmax(j)=i) and replacing the value in Pmax with the current pixel amplitude. (Pmax=P(i,j)). Then proceed to step 310 to process the next row. Step 316 represents a decision made after all the rows in the current column have been processed, does the location of the maximum pixel in the current column fall within the allowed limits?

$$Cmax >= Row\ min\ \&\&\ Cmax <= Row\ max$$

If both conditions are true, we have a valid maximum light stripe pixel, proceed to step 318 to compute the centroid. If either of the conditions is not true, proceed to step 322. In Step 322, the conditions in step 316 have not been met and there is no centroid value for this column. Therefore, the element in the centroid vector for this the jth column is set to zero (Cent(j)=0) and control moves to step 304 to process the next column. In step 318 a loop counter n is set up and two summation variables are cleared as follows, $$n = Cmax(j) - 10,\ Sum1 = 0,\ Sum2 = 0.$$

The centroid calculation will be performed on a span of 20 pixels centered around the brightest pixel in the light stripe. This +/− 10 pixel band will completely cover the entire range of the light stripe with a margin of dark pixels on each side. Step 320 contains a decision that forms a loop counter for the +/− 10 pixel band around the light stripe. The loop is terminated when counter n (which began at center value minus ten) exceeds the center pixel value plus ten (n>Cmax (j))+10). If n is still inside the +/−10 pixel band control moves to step 324 to process the next pixel, otherwise control moves to step 326 to complete the centroid calculation for that column. In step 324 two sums are computed. Sum1 is the sum of the pixel value multiplied by the row number, while Sum2 is the direct sum of the pixel values. The row counter n is also incremented as follows: Sum1= Sum1+P(n,j)*n, Sum2=Sum2 +P(n,j), n=n+1.

Control now returns to Step 320 to process the next pixel in the centroid calculation. Reaching step 326, the centroid calculation for this column is complete and the centroid value is found by dividing Sum1 by Sum2 as follows Cent(j))=Sum1/Sum2. Control then moves to Step 304 to process the next column.

The flowchart of FIG. 24 provides detail on the height calibration routine, called out in step 140, FIG. 15 that takes the centroid data from one light strip image and computes an accurate estimate of the object's height at each centroid value. This calibration is called twice for each image in the scan, once for the upper image and the second time for the lower image. This routine applies the arrays of u and v calibration values computed in the calibration routine to process the centroid data.

Step 330, FIG. 24 is the start of the height calibration routine. Processing is done element by element on the vector of results from the centroid operation. Each element represents an image column and the upper and lower light stripes are processed separately with different baseline and calibration values. When the 640×480 image is split at line 240, pixels 1:240 are processed for the top stripe and pixels 240:480 for bottom stripe, then the value BToffset=0 is used when processing the top portion and BToffset=239 when processing the bottom portion of the image. Step 332 is a decision, do more elements (i) remain in the vector of centroid values to be processed? If no more elements remain, proceed to step 334, otherwise continue on step 336. Step 334 processing of the set of centroid values is complete, return to the Step 140 with the vector (Z) of the calibrated heights. In step 336 the difference pixel position (dP) is calculated by subtracting the baseline value, determined in the calibration routine, and a bottom offset (BToffset) that compensates for bottom or top image position, in the following calculation dP(i)=Cent(i)−Baseline(i)+BToffset. In step 338 a decision is made to detect centroid values that were set to zero. If dP(i) equals (BToffset−Baseline(i)) then there is no data in this element, proceed to step 340, otherwise proceed to step 342. Step 340, because there is no data at this index (i) location in the centroid vector, set the height values equal to zero (Z(i)=0) and proceed to step 332 for the next element (i) in the centroid vector (Cent(i)). Step 342 the data is valid and the height calibration will be performed. Calibration is performed using the following equation, {ul indicates upper or lower index}

$$Z(i) = dP(i) / [u_{ul}(i) + v_{ul}(i) * dP(i)].$$

Now proceed to step 332 for the next element (i) in the centroid vector (Cent(i)).

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A non-contacting mensuration system comprising:
    a light source for projecting light on a target;
    an imager having an image plane;
    a first optical subsystem configured to project a first image of the light on the target onto a first portion of the image plane of the imager; and
    a second optical subsystem configured to project a second image of the light on the target onto a second portion of the image plane of the imager so that two different images are obtained from different aspects simultaneously.

2. The non-contacting mensuration system of claim 1 in which the light source is a laser.

3. The non-contacting mensuration system of claim 1 in which the light source is configured to project a two-dimensional light pattern on the target.

4. The non-contacting mensuration system of claim 3 in which the two dimensional light pattern is a stripe.

5. The non-contacting mensuration system of claim 1 in which the imager is a single CCD camera.

6. The non-contacting mensuration system of claim 1 in which the first optical subsystem includes a first mirror on one side of the light source oriented to view the first image from a first aspect and a second mirror behind the light source oriented to direct the first image onto the first portion of the image plane.

7. The non-contacting mensuration system of claim 6 in which the second optical subsystem includes a third mirror on another side of the light source oriented to view the second image from a second aspect and a fourth mirror behind the light source oriented to direct the second image onto the second portion of the image plane.

8. The non-contacting mensuration system of claim 7 in which the second mirror and the fourth mirror are opposing faces of a prism.

9. The non-contacting mensuration system of claim 8 in which the light source is positioned directly in front of the image plane of the imager.

10. The non-contacting mensuration system of claim 9 in which the prism is positioned between the light source and the image plane of the imager.

11. The non-contacting mensuration system of claim 7 in which the third mirror is oriented to provide a 30° observation angle.

12. The non-contacting mensuration system of claim 6 in which the first mirror is oriented to provide a 30° observation angle.

13. The non-contacting mensuration system of claim 1 further including means for moving the target relative the light source.

14. The non-contacting mensuration system of claim 13 in which the means for moving the target includes a turntable upon which the target is placed.

15. A non-contacting mensuration system comprising:
    a light source for projecting light onto a target;
    an imager having an image plane;
    one mirror located on one side of the light source and oriented to view the target from a first aspect;
    another mirror lacated on another side of the light source and oriented to view the target from a second aspect; and
    a prism positioned between the light source and the image plane of the imager having opposing mirror faces oriented to direct images from the two mirrors onto first and second portions on the image plane of the imager simultaneously.

* * * * *